(12) United States Patent
Suzuki et al.

(10) Patent No.: US 12,286,513 B2
(45) Date of Patent: *Apr. 29, 2025

(54) METHOD FOR PRODUCING FLUORINE-CONTAINING POLYMER AND COMPOSITION THEREOF

(71) Applicant: DAIKIN INDUSTRIES, LTD., Osaka (JP)

(72) Inventors: Yuuki Suzuki, Osaka (JP); Makoto Matsuura, Osaka (JP); Akitoshi Ogata, Osaka (JP); Atsushi Shirai, Osaka (JP); Michiaki Okada, Osaka (JP); Shiomi Ashida, Osaka (JP); Yoshito Tanaka, Osaka (JP); Yosuke Kishikawa, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 370 days.

This patent is subject to a terminal disclaimer.

(21) Appl. No.: 17/733,247

(22) Filed: Apr. 29, 2022

(65) Prior Publication Data

US 2022/0267536 A1 Aug. 25, 2022

Related U.S. Application Data

(63) Continuation of application No. PCT/JP2020/040007, filed on Oct. 23, 2020.

(30) Foreign Application Priority Data

Nov. 1, 2019 (JP) .................................. 2019-199682

(51) Int. Cl.
C08G 79/00 (2006.01)
(52) U.S. Cl.
CPC ..................................... C08G 79/00 (2013.01)
(58) Field of Classification Search
None
See application file for complete search history.

(56) References Cited

U.S. PATENT DOCUMENTS

| | | | | |
|---|---|---|---|---|
| 3,308,107 | A * | 3/1967 | Selman | .................... C08F 24/00 526/236 |
| 5,408,020 | A | 4/1995 | Hung et al. | |
| 2006/0189788 | A1 | 8/2006 | Araki et al. | |
| 2010/0200740 | A1 | 8/2010 | Ino et al. | |
| 2011/0105686 | A1* | 5/2011 | Kashiwagi | .............. H04R 31/00 528/402 |
| 2014/0147773 | A1 | 5/2014 | Takebe | |
| 2015/0030962 | A1 | 1/2015 | Hommura et al. | |
| 2019/0169326 | A1 | 6/2019 | Sugiyama | |
| 2021/0380735 | A1 | 12/2021 | Sakaguchi et al. | |
| 2022/0002262 | A1* | 1/2022 | Miyauchi | ............. C07D 317/42 |
| 2022/0041767 | A1 | 2/2022 | Yumino et al. | |
| 2022/0259453 | A1 | 8/2022 | Morita et al. | |
| 2022/0259454 | A1 | 8/2022 | Morita et al. | |
| 2022/0332865 | A1 | 10/2022 | Tanaka et al. | |
| 2022/0348704 | A1 | 11/2022 | Tanaka et al. | |
| 2022/0355586 | A1 | 11/2022 | Tanaka et al. | |
| 2022/0363934 | A1 | 11/2022 | Tanaka et al. | |
| 2023/0118752 | A1 | 4/2023 | Sakaguchi et al. | |

FOREIGN PATENT DOCUMENTS

| | | |
|---|---|---|
| JP | 63-30509 | 2/1988 |
| JP | 9-512854 | 12/1997 |
| JP | 2005-314482 | 11/2005 |
| JP | 2018-119019 | 8/2018 |
| JP | 2020-122068 | 8/2020 |
| WO | 95/30699 | 11/1995 |
| WO | 2004/092235 | 10/2004 |
| WO | WO 2004092235 A1 * | 10/2004 |
| WO | 2009/034952 | 3/2009 |
| WO | 2012/086185 | 6/2012 |
| WO | 2013/018730 | 2/2013 |
| WO | 2013/157395 | 10/2013 |
| WO | 2018/043165 | 3/2018 |

(Continued)

OTHER PUBLICATIONS

František Mikeš et al., "Synthesis and Characterization of an Amorphous Perfluoropolymer: Poly(perfluoro-2-methylene-4-methyl-1,3-dioxolane)", Macromolecules, (2005), vol. 38, pp. 4237-4245.
The 155th Committee on Fluorine Chemistry, Japan Society for the Promotion of Science, ed. Fusso Kagaku Nyumon 2010 Kiso to Oyo no Saizensen [Introduction to Fluorine Chemistry 2010: Frontiers of Basics and Applications], Sankyo Shuppan Co., Ltd., pp. 236-243 with English translation.
International Preliminary Report on Patentability issued May 3, 2022 in International PCT Application No. PCT/JP2020/040007.
P.A. Glukhov et al., "Synthesis resin on cyclohexanone and hexametilentetramin basis," Bashkir Chemical Journal, 2012, vol. 19.5, Korshunov readings, pp. 25-28 with abstract and partial English-language translation.

(Continued)

*Primary Examiner* — Tae H Yoon
(74) *Attorney, Agent, or Firm* — WENDEROTH, LIND & PONACK, L.L.P.

(57) ABSTRACT

An object of the present disclosure is to provide a method for producing a fluorine-containing polymer and a composition containing the fluorine-containing polymer. The present disclosure provides a composition comprising (A) a fluorine-containing polymer comprising as a main component a structural unit containing a fluorine-containing aliphatic ring, and (B) an aprotic solvent, wherein the fluorine-containing aliphatic ring of the fluorine-containing polymer (A) contains one, two, or three etheric oxygen atoms as a ring-constituting atom; when the fluorine-containing aliphatic ring contains a plurality of etheric oxygen atoms, the etheric oxygen atoms are not adjacent to each other; and the fluorine-containing polymer (A) is present in an amount of 20 mass % or more based on the mass of the composition.

19 Claims, No Drawings

(56) References Cited

FOREIGN PATENT DOCUMENTS

| WO | 2020/067421 | 4/2020 |
| WO | 2020/075724 | 4/2020 |
| WO | 2021/090812 | 5/2021 |
| WO | 2021/090814 | 5/2021 |
| WO | 2021/141059 | 7/2021 |
| WO | 2021/141060 | 7/2021 |
| WO | 2021/141062 | 7/2021 |
| WO | 2021/141065 | 7/2021 |
| WO | 2021/193717 | 9/2021 |

OTHER PUBLICATIONS

Journal: Bulletin of TSU, 2013, vol. 18, issue 4, pp. 1238-1251 with abstract and partial English-language translation.

Minfeng Fang et al., "High performance perfluorodioxolane copolymer membranes for gas separation with tailored selectivity enhancement", Journal of Materials Chemistry A, (2018), vol. 6, pp. 652-658.

Y. Okamoto et al., "The effect of fluorine substituents on the polymerization mechanism of 2-methylene-1,3-dioxolane and properties of the polymer products", Journal of Fluorine Chemistry, vol. 128, (2007), pp. 202-206.

Minfeng Fang et al., "Mechanical and optical properties of the copolymers of perfluoro(2-methylene-4-methyl-1,3-dioxolane) and chlorotrifluoroethylene", Journal of Fluorine Chemistry, vol. 214, (2018), pp. 63-67.

International Search Report issued Dec. 28, 2020 in International (PCT) Application No. PCT/JP2020/040007.

French et al., "Novel hydrofluorocarbon polymers for use as pellicles in 157 nm semiconductor photolithography: fundamentals of transparency", Journal of Fluorine Chemistry, 2003, vol. 122, No. 1, pp. 63-80.

Extended European Search Report issued Nov. 20, 2023 in corresponding European Patent Application No. 20881527.4.

Extended European Search Report issued Oct. 21, 2024 in European Patent Application No. 24184688.0.

* cited by examiner

METHOD FOR PRODUCING FLUORINE-CONTAINING POLYMER AND COMPOSITION THEREOF

TECHNICAL FIELD

The present disclosure relates to a method for producing a fluorine-containing polymer, a composition containing the fluorine-containing polymer, and the like.

BACKGROUND ART

Fluorine-containing polymers obtained by polymerizing a fluorine-containing monomer having one or more polymerizable carbon-carbon double bonds and one or more oxygen atoms as a ring-constituting atom have been used as, for example, coating materials for anti-reflection films formed on photoresist layers in photolithography technology.

Patent Literature (PTL) 1 discloses that $CF_3CF_2CF_2CF_2CF_2CF_2CH_2CH_3$ as a solvent was added to a fluorine-containing polymer obtained by polymerizing $CF_2=CFOCF_2CF_2CF=CF_2$, thereby obtaining a composition having a fluorine-containing polymer content of 20 mass % (Example 6 of PTL 1).

PTL 2 discloses that $CF_2=CFCF_2CF_2OCF=CF_2$ and another fluorine-containing monomer were copolymerized in the absence of a solvent, thereby obtaining a fluorine-containing polymer (Example 2 of PTL 2).

PTL 3 discloses that a solution composition containing a fluorine-containing polymer in an amount of 10 mass % was obtained (Production Examples 1 to 7 of PTL 3).

CITATION LIST

Patent Literature

PTL 1: JP2018-119019A
PTL 2: JP2005-314482A
PTL 3: WO2013/018730

SUMMARY

The present disclosure includes, for example, the following embodiments.

A composition comprising:

(A) a fluorine-containing polymer comprising as a main component a structural unit containing a fluorine-containing aliphatic ring; and (B) an aprotic solvent, wherein the fluorine-containing aliphatic ring of the fluorine-containing polymer (A) contains one, two, or three etheric oxygen atoms as a ring-constituting atom;

when the fluorine-containing aliphatic ring contains a plurality of etheric oxygen atoms, the etheric oxygen atoms are not adjacent to each other; and the fluorine-containing polymer (A) is present in an amount of 20 mass % or more based on the mass of the composition.

Advantageous Effects

The present disclosure provides a method for producing a fluorine-containing polymer that comprises as a main component a structural unit containing a fluorine-containing aliphatic ring and that can be dissolved at a high concentration (in particular, 20 mass % or more) in an aprotic solvent. The present disclosure provides a composition in which a fluorine-containing polymer comprising as a main component a structural unit containing a fluorine-containing aliphatic ring is dissolved at a high concentration (in particular, 20 mass % or more) in an aprotic solvent. The present disclosure can provide a composition comprising a fluorine-containing polymer containing the structural unit represented by formula (A3) described above as a main component, which has been considered to be difficult to dissolve in a nonperfluoro solvent; and a nonperfluoro solvent, wherein the fluorine-containing polymer is dissolved.

DESCRIPTION OF EMBODIMENTS

The above overview of the present disclosure is not intended to describe each of the disclosed embodiments or all of the implementations of the present disclosure.

The following description of the present disclosure more specifically exemplifies illustrative embodiments.

Guidance is provided through examples in several parts of the present disclosure, and these examples can be used in various combinations.

In each case, the group of examples can function as a non-exclusive and representative group.

All publications, patents, and patent applications cited herein are incorporated herein by reference in their entirety.

Terms

Unless otherwise specified, the symbols and abbreviations in the present specification can be understood in the context of the present specification in the meanings commonly used in the technical field to which the present disclosure belongs.

In the present specification, the terms "comprise" and "contain" are used with the intention of including the terms "consisting essentially of" and "consisting of."

Unless otherwise specified, the steps, treatments, or operations described in the present specification may be performed at room temperature. In the present specification, room temperature can refer to a temperature within the range of 10 to 40° C.

In the present specification, the phrase "$C_n$-$C_m$" (n and m are each a number) indicates that the number of carbon atoms is n or more and m or less, as a person skilled in the art would generally understand.

In the present specification, the description of compounds can include all stereoisomers (enantiomers, diastereomers, geometric isomers, etc.) unless otherwise specified by a person skilled in the art.

In the present specification, the phrases "compound represented by formula (N)," "structural unit represented by formula (N)," and "monomer represented by formula (N)" can be referred to as "compound (N)," "structural unit (N)," and "monomer (N)," respectively.

In the present specification, unless otherwise specified, the "fluorine-containing aliphatic ring" contains a plurality of carbon atoms and one, two, or three etheric oxygen atoms as ring-constituting atoms. When the "fluorine-containing aliphatic ring" contains a plurality of oxygen atoms as ring-constituting atoms, the oxygen atoms are not adjacent to each other.

The "fluorine-containing aliphatic ring" includes a saturated aliphatic monocyclic ring containing one or more fluorine atoms.

The "fluorine-containing aliphatic ring" includes a ring of four or more members (e.g., a 4-membered ring, a 5-membered ring, a 6-membered ring, or a 7-membered ring).

The "fluorine-containing aliphatic ring" may have at least one group selected from the group consisting of perfluoroalkyl (e.g., $C_1$-$C_5$ linear or branched perfluoroalkyl) and perfluoroalkoxy (e.g., $C_1$-$C_5$ linear or branched perfluoroalkoxy) as a substituent. The number of substituents may be one or more, such as one to four, one to three, one to two, one, two, three, or four.

In the "fluorine-containing aliphatic ring," one or more fluorine atoms may be attached to one or more ring-constituting carbon atoms.

Examples of the "fluorine-containing aliphatic ring" include perfluorooxetane optionally having one or more substituents, perfluorotetrahydrofuran optionally having one or more substituents, perfluorodioxolane optionally having one or more substituents, perfluorotetrahydropyran optionally having one or more substituents, perfluoro-1,3-dioxane optionally having one or more substituents, perfluorooxepane optionally having one or more substituents, perfluoro-1,3-dioxepane optionally having one or more substituents, perfluoro-1,4-dioxepane optionally having one or more substituents, and perfluoro-1,3,5-trioxepane optionally having one or more substituents.

In the present specification, unless otherwise specified, examples of "alkyl" include linear or branched $C_1$-$C_{10}$ alkyl, such as methyl, ethyl, propyl, isopropyl, butyl, isobutyl, sec-butyl, tert-butyl, pentyl, isopentyl, neopentyl, hexyl, heptyl, octyl, nonyl, and decyl.

In the present specification, unless otherwise specified, "fluoroalkyl" is alkyl in which at least one hydrogen atom is replaced by a fluorine atom. "Fluoroalkyl" may be linear or branched fluoroalkyl.

The number of carbon atoms in "fluoroalkyl" may be, for example, 1 to 12, 1 to 6, 1 to 5, 1 to 4, 1 to 3, 6, 5, 4, 3, 2, or 1.

The number of fluorine atoms in "fluoroalkyl" may be 1 or more (e.g., 1 to 3, 1 to 5, 1 to 9, 1 to 11, or 1 to the maximum substitutable number).

"Fluoroalkyl" includes perfluoroalkyl. "Perfluoroalkyl" is alkyl in which all of the hydrogen atoms are replaced by fluorine atoms.

Examples of perfluoroalkyl include trifluoromethyl ($CF_3$—), pentafluoroethyl ($C_2F_5$—), heptafluoropropyl ($CF_3CF_2CF_2$—), and heptafluoroisopropyl (($CF_3)_2CF$—).

Specific examples of "fluoroalkyl" include monofluoromethyl, difluoromethyl, trifluoromethyl ($CF_3$—), 2,2,2-trifluoroethyl, perfluoroethyl ($C_2F_5$—), tetrafluoropropyl (e.g., $HCF_2CF_2CH_2$—), hexafluoropropyl (e.g., ($CF_3)_2CH$—), perfluorobutyl (e.g., $CF_3CF_2CF_2CF_2$—), octafluoropentyl (e.g., $HCF_2CF_2CF_2CF_2CH_2$—), perfluoropentyl (e.g., $CF_3CF_2CF_2CF_2CF_2$—), perfluorohexyl (e.g., $CF_3CF_2CF_2CF_2CF_2CF_2$—), and the like.

In the present specification, unless otherwise specified, "alkoxy" may be a group represented by RO—, wherein R is alkyl (e.g., $C_{1-10}$ alkyl).

Examples of "alkoxy" include linear or branched $C_1$-$C_{10}$ alkoxy, such as methoxy, ethoxy, propoxy, isopropoxy, butoxy, isobutoxy, sec-butoxy, tert-butoxy, pentyloxy, isopentyloxy, neopentyloxy, hexyloxy, heptyloxy, octyloxy, nonyloxy, and decyloxy.

In the present specification, unless otherwise specified, "fluoroalkoxy" is alkoxy in which at least one hydrogen atom is replaced by a fluorine atom. "Fluoroalkoxy" may be linear or branched fluoroalkoxy.

The number of carbon atoms in "fluoroalkoxy" may be, for example, 1 to 12, 1 to 6, 1 to 5, 1 to 4, 1 to 3, 6, 5, 4, 3, 2, or 1.

The number of fluorine atoms in "fluoroalkoxy" may be 1 or more (e.g., 1 to 3, 1 to 5, 1 to 9, 1 to 11, or 1 to the maximum substitutable number).

"Fluoroalkoxy" includes perfluoroalkoxy. "Perfluoroalkoxy" is alkoxy in which all of the hydrogen atoms are replaced by fluorine atoms.

Examples of "perfluoroalkoxy" include trifluoromethoxy, pentafluoroethoxy, heptafluoropropoxy, and heptafluoroisopropoxy.

Specific examples of "fluoroalkoxy" include fluoromethoxy, difluoromethoxy, trifluoromethoxy, pentafluoroethoxy, heptafluoropropoxy (e.g., $CF_3CF$—$CF_2O$—, ($CF_3)_2CFO$—), nonafluorobutoxy (e.g., $CF_3CF_2CF_2CF_2O$—, ($CF_3)_3CO$—), and the like.

Composition

An embodiment of the present disclosure is a composition comprising (A) a fluorine-containing polymer comprising as a main component a structural unit containing a fluorine-containing aliphatic ring and (B) an aprotic solvent. It is preferable that the composition is in a liquid form and that the fluorine-containing polymer (A) is dissolved.

In the composition, the fluorine-containing aliphatic ring of the fluorine-containing polymer (A) contains one, two, or three etheric oxygen atoms as a ring-constituting atom, and when the fluorine-containing aliphatic ring contains a plurality of etheric oxygen atoms, the etheric oxygen atoms are not adjacent to each other.

Fluorine-Containing Polymer (A)

The fluorine-containing polymer (A) comprises as a main component a structural unit containing a fluorine-containing aliphatic ring. The phrase "comprises as a main component a structural unit" means that the proportion of this structural unit in all of the structural units in the fluorine-containing polymer (A) is 50 mol % or more.

The proportion of the structural unit containing a fluorine-containing aliphatic ring in the fluorine-containing polymer (A) is preferably 80 mol % or more, more preferably 90 mol % or more, and particularly preferably 100 mol %.

The structural unit containing a fluorine-containing aliphatic ring in the fluorine-containing polymer (A) may be one or more types of structural units containing a fluorine-containing aliphatic ring, preferably one to three types, more preferably one or two types, and particularly preferably one type.

The structural unit containing a fluorine-containing aliphatic ring contains one, two, or three etheric oxygen atoms as a ring-constituting atom, and when the fluorine-containing aliphatic ring contains a plurality of etheric oxygen atoms, the etheric oxygen atoms are not adjacent to each other.

The fluorine-containing aliphatic ring may contain two or more (e.g., two, three, or four) carbon atoms as ring-constituting atoms and may contain one or more (e.g., one, two, three, four, five, or six) carbon-carbon bonds formed between adjacent carbon atoms.

The fluorine-containing aliphatic ring preferably contains two or more carbon atoms and one, two, or three oxygen atoms and contains no other atoms, as ring-constituting atoms.

The fluorine-containing aliphatic ring preferably contains no hydrogen atoms.

The fluorine-containing aliphatic ring is preferably an aliphatic ring in which all of the hydrogen atoms are replaced by fluorine atoms.

The fluorine-containing aliphatic ring may be a 4-, 5-, 6-, or 7-membered ring. From the viewpoint of various physical properties of the fluorine-containing polymer (A), the fluorine-containing aliphatic ring is preferably a 4-, 5-, or 6-membered ring, and more preferably a 5-membered ring.

The fluorine-containing aliphatic 4-membered ring may contain three carbon atoms and one oxygen atom as ring-constituting atoms. Examples of the fluorine-containing aliphatic 4-membered ring include a perfluorooxetane ring.

The fluorine-containing aliphatic 5-membered ring may contain four carbon atoms and one oxygen atom as ring-constituting atoms or may contain three carbon atoms and two oxygen atoms as ring-constituting atoms. Examples of the fluorine-containing aliphatic 5-membered ring include a perfluorotetrahydrofuran ring and a perfluorodioxolane ring.

The fluorine-containing aliphatic 6-membered ring may contain five carbon atoms and one oxygen atom as ring-constituting atoms or may contain four carbon atoms and two oxygen atoms as ring-constituting atoms. Examples of the fluorine-containing aliphatic 6-membered ring include a perfluorotetrahydropyran ring and a perfluoro-1,3-dioxane ring.

The fluorine-containing aliphatic 7-membered ring may contain six carbon atoms and one oxygen atom as ring-constituting atoms, may contain five carbon atoms and two oxygen atoms as ring-constituting atoms, or may contain four carbon atoms and three oxygen atoms as ring-constituting atoms. Examples of the fluorine-containing aliphatic 7-membered ring include a perfluorooxepane ring, a perfluoro-1,3-dioxepane ring, a perfluoro-1,4-dioxepane ring, and a perfluoro-1,3,5-trioxepane ring.

The fluorine-containing aliphatic ring optionally has at least one substituent. When the fluorine-containing aliphatic ring has a plurality of substituents, the substituents may be the same or different.

The substituent may be at least one group selected from the group consisting of perfluoroalkyl (e.g., linear or branched $C_1$-$C_5$ perfluoroalkyl) and perfluoroalkoxy (e.g., linear or branched $C_1$-$C_5$ perfluoroalkoxy). The number of substituents may be one or more, such as one to four, one to three, one to two, one, two, three, or four.

The substituent is preferably at least one group selected from the group consisting of trifluoromethyl, perfluoroethyl, perfluoropropyl, perfluoroisopropyl, trifluoromethoxy, and perfluoroethoxy, more preferably at least one group selected from the group consisting of trifluoromethyl, perfluoroethyl, perfluoropropyl, and perfluoroisopropyl, and particularly preferably at least one group selected from the group consisting of trifluoromethyl, perfluoroethyl, and trifluoromethoxy.

The structural unit containing the fluorine-containing aliphatic ring may contain one or two perfluoroalkylene groups in addition to the fluorine-containing aliphatic ring. The perfluoroalkylene(s) is/are bonded to ring-constituting carbon atom(s) of the fluorine-containing aliphatic ring to form the main chain of the fluorine-containing polymer (A).

An example of the perfluoroalkylene(s) is two —$CF_2$—, excluding the perfluoromethylene constituting the ring in a structural unit represented by the following formula (A1-1):

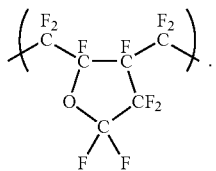

(A1-1)

The number of perfluoroalkylene groups in the structural unit may be one. When two perfluoroalkylene groups are contained, they may be the same or different.

An example of perfluoroalkylene is alkylene represented by —$(CF_2)_n$-, wherein n is an integer of 1 to 4.

The perfluoroalkylene contained in the structural unit containing the fluorine-containing aliphatic ring may have one or more perfluoroalkyl groups as a substituent. When a plurality of perfluoroalkyl groups as substituents are present, they may be the same or different. The number of substituents may be one or more, such as one to four, one to three, one to two, one, two, three, or four.

The substituent is preferably at least one group selected from the group consisting of trifluoromethyl, pentafluoroethyl, heptafluoropropyl, and heptafluoroisopropyl, and more preferably at least one group selected from the group consisting of trifluoromethyl and pentafluoroethyl.

The structural unit containing the fluorine-containing aliphatic ring may be a structural unit represented by any of the following formulas (A1) to (A3) (which may be referred to as "structural unit (A1)," "structural unit (A2)," and "structural unit (A3)," respectively, in the present specification). The structural units (A1), (A2), and (A3) may be used singly or in a combination of two or more.

(A1)

wherein $R^1$ represents fluorine or $C_1$-$C_5$ perfluoroalkyl.

(A2)

wherein $R^2$ to $R^5$ each independently represent fluorine, $C_1$-$C_5$ perfluoroalkyl, or $C_1$-$C_5$ perfluoroalkoxy.

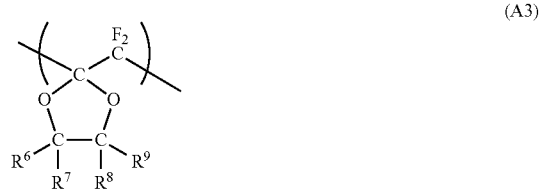

(A3)

wherein $R^6$ to $R^9$ each independently represent fluorine, $C_1$-$C_5$ perfluoroalkyl, or $C_1$-$C_5$ perfluoroalkoxy.

In the structural unit (A1), $R^1$ may be fluorine or $C_1$-$C_4$ linear or branched perfluoroalkyl. $R^1$ is preferably fluorine, trifluoromethyl, or perfluoroethyl, more preferably fluorine or trifluoromethyl, and particularly preferably fluorine.

Preferred examples of the structural unit (A1) include a structural unit represented by the following formula (A1-1) (which may be referred to as "structural unit (A1-1)" in the present specification).

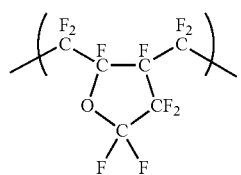

(A1-1)

In the structural unit (A2), $R^2$ to $R^5$ may be each independently fluorine, $C_1$-$C_3$ linear or branched perfluoroalkyl, or $C_1$-$C_3$ linear or branched perfluoroalkoxy. $R^2$ to $R^5$ are preferably each independently fluorine, trifluoromethyl, pentafluoroethyl, or trifluoromethoxy, and more preferably fluorine, trifluoromethyl, or trifluoromethoxy.

The structural unit (A2) is preferably a structural unit of formula (A2), wherein $R^2$ and $R^3$ each independently represent fluorine, trifluoromethyl, or trifluoromethoxy, and $R^4$ and $R^5$ each independently represent fluorine or trifluoromethyl.

The structural unit (A2) is more preferably a structural unit of formula (A2), wherein $R^2$ represents fluorine, $R^3$ represents fluorine, trifluoromethyl, or trifluoromethoxy, and $R^4$ and $R^5$ each independently represent fluorine or trifluoromethyl.

The structural unit (A2) is particularly preferably a structural unit of formula (A2), wherein $R^2$ represents fluorine, $R^3$ represents fluorine or trifluoromethoxy, and $R^4$ and $R^5$ are the same and represent fluorine or trifluoromethyl.

Preferred examples of the structural unit (A2) include structural units represented by the following formulas (which may be referred to as "structural unit (A2-1)" and "structural unit (A2-2)" in the present specification).

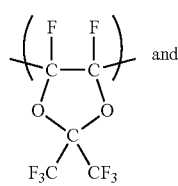

(A2-1)

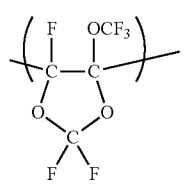

(A2-2)

In the structural unit (A3), $R^6$ to $R^5$ may be each independently fluorine, $C_1$-$C_3$ linear or branched perfluoroalkyl, or $C_1$-$C_3$ linear or branched perfluoroalkoxy. $R^6$ to $R^9$ are preferably each independently fluorine, trifluoromethyl, perfluoroethyl, or trifluoromethoxy, and more preferably fluorine, trifluoromethyl, or trifluoromethoxy.

The structural unit (A3) is preferably a structural unit of formula (A3), wherein $R^6$ to $R^9$ each independently represent fluorine or trifluoromethyl.

The structural unit (A3) is more preferably a structural unit of formula (A3),
wherein $R^6$ to $R^9$ represent fluorine;
$R^6$ to $R^8$ represent fluorine, and $R^9$ represents trifluoromethyl;
$R^6$ represents trifluoromethyl, and $R^7$ to $R^9$ represent fluorine; or
$R^6$ and $R^9$ represent trifluoromethyl, and $R^7$ and $R^8$ represent fluorine.

Preferred examples of the structural unit (A3) include a structural unit represented by the following formula (which may be referred to as "structural unit (A3-1)" in the present specification).

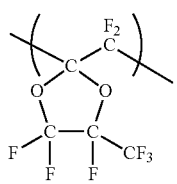

(A3-1)

The fluorine-containing polymer (A) may comprise other structural units in addition to the structural unit containing the fluorine-containing aliphatic ring contained as the main component. The proportion of the other structural units in all of the structural units in the fluorine-containing polymer (A) may be 50 mol % or less, preferably 20 mol % or less, more preferably 10 mol % or less, and particularly preferably 0 mol %.

Examples of the other structural units include, but are not limited to, a structural unit represented by the following formula (A11) (which may be referred to as "structural unit (A11)" in the present specification):

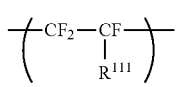

(A11)

wherein $R^{111}$ represents fluorine, $C_1$-$C_6$ perfluoroalkyl, or $C_1$-$C_6$ perfluoroalkoxy.

For example, the fluorine-containing polymer (A) may contain the structural unit (A2-1) and a structural unit represented by the following formula (A11-1) (which may be referred to as "structural unit (A11-1)" in the present specification):

(A11-1)

$R^{111}$ may be fluorine, linear or branched $C_1$-$C_6$ perfluoroalkyl, or linear or branched $C_1$-$C_6$ perfluoroalkoxy.

$R^{111}$ is preferably fluorine, linear or branched $C_1$-$C_4$ perfluoroalkyl, or linear or branched $C_1$-$C_4$ perfluoroalkoxy.

$R^{111}$ is more preferably fluorine, linear or branched $C_1$-$C_3$ perfluoroalkyl, or linear or branched $C_1$-$C_3$ perfluoroalkoxy.

$R^{111}$ is particularly preferably fluorine or trifluoroalkyl.

The mass average molecular weight of the fluorine-containing polymer (A) may be, for example, within the range of 5000 to 1000000, 10000 to 1000000, 10000 to 500000, or 90000 to 350000. The mass average molecular weight of the fluorine-containing polymer (A) is preferably within the range of 10000 to 750000, more preferably 40000 to 500000, and particularly preferably 70000 to 350000.

The lower limit of the mass average molecular weight of the fluorine-containing polymer (A) may be, for example, 5000 or more, preferably 10000 or more, more preferably 40000 or more, and particularly preferably 70000 or more. The upper limit of the mass average molecular weight of the fluorine-containing polymer (A) may be, for example, 1000000 or less, preferably 750000 or less, more preferably 500000 or less, and particularly preferably 350000 or less. The above upper and lower limits may be appropriately combined.

The mass average molecular weight of the fluorine-containing polymer (A) is a value determined by a gel permeation chromatography (GPC) method (in particular, the GPC method described later in the Examples).

In the composition according to the present disclosure, the content of the fluorine-containing polymer (A) may be 20 mass % or more based on the mass of the composition. The content of the fluorine-containing polymer (A) may be preferably within the range of 20 mass % to 65 mass %, more preferably greater than 20 mass % to 65 mass %, and particularly preferably greater than 20 mass % to 50 mass %, based on the mass of the composition.

The fluorine-containing polymer (A) other than a polymer comprising the structural unit (A3) as the main component means a polymer that is not a polymer comprising the structural unit (A3) as the main component, among the fluorine-containing polymers (A) mentioned above. In other words, the fluorine-containing polymer (A) other than a polymer comprising the structural unit (A3) as the main component means a fluorine-containing polymer (A) that comprises as the main component a structural unit containing a fluorine-containing aliphatic ring, wherein the fluorine-containing aliphatic ring contains one, two, or three etheric oxygen atoms as a ring-constituting atom, and when the fluorine-containing aliphatic ring contains a plurality of etheric oxygen atoms, the etheric oxygen atoms are not adjacent to each other; and that is not a polymer comprising the structural unit (A3) as the main component.

The fluorine-containing polymer (A) can be synthesized by a known method. For example, the fluorine-containing polymer (A) can be synthesized by polymerizing a monomer corresponding to the structural unit of the fluorine-containing polymer. The polymerization method may be, for example, radical polymerization, bulk polymerization, solution polymerization, suspension polymerization, or emulsion polymerization. The method for producing the fluorine-containing polymer (A) according to the present disclosure is particularly preferable because the fluorine-containing polymer (A) can be dissolved in a solvent at a high concentration.

Aprotic Solvent (B)

The composition according to the present disclosure comprises an aprotic solvent (B). The aprotic solvent is, for example, at least one member selected from the group consisting of perfluoro solvents and nonperfluoro solvents.

The perfluoro solvent is an aprotic solvent that contains fluorine and carbon atoms and contains no hydrogen atoms. Examples of perfluoro solvents include perfluoroaromatic compounds, perfluorotrialkylamines, perfluoroalkanes, perfluorocyclic ethers, and the like. The perfluoro solvents may be used singly or in a combination of two or more.

The nonperfluoro solvent is an aprotic solvent that contains fluorine, carbon, and hydrogen atoms. Examples of nonperfluoro solvents include hydrofluorocarbons, hydrofluoroethers, olefin compounds containing at least one chlorine atom, and the like. The nonperfluoro solvents may be used singly or in a combination of two or more. Nonperfluoro solvents have global warming potentials that are generally lower than those of perfluoro solvents, and are thus preferred solvents in terms of the burden on the environment. On the other hand, nonperfluoro solvents have been considered to have a low ability to dissolve fluoropolymers. However, the present inventors found that nonperfluoro solvents can dissolve a polymer comprising the structural unit (A3) as the main component.

The perfluoroaromatic compound is, for example, a perfluoroaromatic compound optionally having one or more perfluoroalkyl groups. The aromatic ring of the perfluoroaromatic compound may be at least one ring selected from the group consisting of a benzene ring, a naphthalene ring, and an anthracene ring. The perfluoroaromatic compound may have one or more (e.g., one, two, or three) aromatic rings.

The perfluoroalkyl group as a substituent is, for example, linear or branched $C_1$-$C_6$, $C_1$-$C_5$, or $C_1$-$C_4$ perfluoroalkyl, preferably linear or branched $C_1$-$C_3$ perfluoroalkyl, and more preferably trifluoromethyl or pentafluoroethyl.

The number of substituents is, for example, one to four, preferably one to three, and more preferably one to two. When a plurality of substituents are present, they may be the same or different.

Examples of perfluoroaromatic compounds include perfluorobenzene, perfluorotoluene, perfluoroxylene, and perfluoronaphthalene.

Preferred examples of perfluoroaromatic compounds include perfluorobenzene and perfluorotoluene.

The perfluorotrialkylamine is, for example, an amine substituted with three linear or branched perfluoroalkyl groups. The number of carbon atoms of each perfluoroalkyl group is, for example, 1 to 10, preferably 1 to 5, and more preferably 1 to 4. The perfluoroalkyl groups may be the same or different, and are preferably the same.

Examples of perfluorotrialkylamines include perfluorotrimethylamine, perfluorotriethylamine, perfluorotripropylamine, perfluorotriisopropylamine, perfluorotributylamine, perfluorotri-sec-butylamine, perfluorotri-tert-butylamine, perfluorotripentylamine, perfluorotriisopentylamine, and perfluorotrineopentylamine.

Preferred examples of perfluorotrialkylamines include perfluorotripropylamine and perfluorotributylamine.

The perfluoroalkane is, for example, a linear, branched, or cyclic $C_3$-$C_{12}$ (preferably $C_3$-$C_{10}$, more preferably $C_3$-$C_6$) perfluoroalkane.

Examples of perfluoroalkanes include perfluoropentane, perfluoro-2-methylpentane, perfluorohexane, perfluoro-2-methylhexane, perfluoroheptane, perfluorooctane, perfluorononane, perfluorodecane, perfluorocyclohexane, perfluoro(methylcyclohexane), perfluoro(dimethylcyclohexane) (e.g., perfluoro(1,3-dimethylcyclohexane)), and perfluorodecalin.

Preferred examples of perfluoroalkanes include perfluoropentane, perfluorohexane, perfluoroheptane, and perfluorooctane.

The hydrofluorocarbon is, for example, a $C_3$-$C_8$ hydrofluorocarbon. Examples of hydrofluorocarbons include $CF_3CH_2CF_2H$, $CF_3CH_2CF_2CH_3$, $CF_3CHFCHFC_2F_5$, 1,1,2,2,3,3,4-heptafluorocyclopentane, $CF_3CF_2CF_2CF_2CH_2CH_3$, $CF_3CF_2CF_2CF_2CF_2CHF_2$, and $CF_3CF_2CF_2CF_2CF_2CH_2CH_3$.

Preferred examples of hydrofluorocarbons include $CF_3CH_2CF_2H$ and $CF_3CH_2CF_2CH_3$.

The perfluorocyclic ether is, for example, a perfluorocyclic ether optionally having one or more perfluoroalkyl groups. The ring(s) of the perfluorocyclic ether may be 3- to 6-membered ring(s). The ring(s) of the perfluorocyclic ether may have one or more oxygen atoms as a ring-constituting atom. The ring(s) preferably have one or two oxygen atoms, more preferably one oxygen atom.

The perfluoroalkyl group as a substituent is, for example, linear or branched $C_1$-$C_6$, $C_1$-$C_5$, or $C_1$-$C_4$ perfluoroalkyl. The perfluoroalkyl group is preferably linear or branched $C_1$-$C_3$ perfluoroalkyl.

The number of substituents is, for example, one to four, preferably one to three, and more preferably one to two. When a plurality of substituents are present, they may be the same or different.

Examples of perfluorocyclic ethers include perfluorotetrahydrofuran, perfluoro-5-methyltetrahydrofuran, perfluoro-5-ethyltetrahydrofuran, perfluoro-5-propyltetrahydrofuran, perfluoro-5-butyltetrahydrofuran, and perfluorotetrahydropyran.

Preferred examples of perfluorocyclic ethers include perfluoro-5-ethyltetrahydrofuran and perfluoro-5-butyltetrahydrofuran.

The hydrofluoroether is, for example, a fluorine-containing ether.

The hydrofluoroether preferably has a global warming potential (GWP) of 600 or less, more preferably 400 or less, and particularly preferably 300 or less. The lower limit of the global warming potential (GWP) of the hydrofluoroether may be 1 or more, or 5 or more.

Examples of hydrofluoroethers include $CF_3CF_2CF_2CF_2OCH_3$, $CF_3CF_2CF(CF_3)$ $OCH_3$, $CF_3CF(CF_3)CF_2OCH_3$, $CF_3CF_2CF_2CF_2OC_2H_5$, $CF_3CH_2OCF_2CHF_2$, $C_2F_5CF(OCH_3)C_3F_7$, $(CF_3)_2CHOCH_3$, $(CF_3)_2CFOCH_3$, $CHF_2CF_2OCH_2CF_3$, $CHF_2CF_2CH_2OCF_2CHF_2$, $CF_3CHFCF_2OCH_3$, $CF_3CHFCF_2OCF_3$, trifluoromethyl 1,2,2,2-tetrafluoroethyl ether (HFE-227me), difluoromethyl 1,1,2,2,2-pentafluoroethyl ether (HFE-227mc), trifluoromethyl 1,1,2,2-tetrafluoroethyl ether (HFE-227pc), difluoromethyl 2,2,2-trifluoroethyl ether (HFE-245mf), 2,2-difluoroethyltrifluoromethyl ether (HFE-245pf), 1,1,2,3,3-hexafluoropropyl methyl ether ($CF_3CHFCF_2OCH_3$), 1,1,1,2,2-tetrafluoroethyl 2,2,2-trifluoroethyl ether ($CHF_2CF_2OCH_2CF_3$), and 1,1,1,3,3,3-hexafluoro-2-methoxypropane (($CF_3)_2CHOCH_3$).

Preferred examples of hydrofluoroethers include $CF_3CF_2CF_2CF_2OCH_3$, $CF_3CF_2CF_2CF_2OC_2H_5$, $CF_3CH_2OCF_2CHF_2$, $C_2F_5CF(OCH_3)C_3F_7$, 1,1,2,3,3-hexafluoropropyl methyl ether ($CF_3CHFCF_2OCH_3$), 1,1,1,2,2-tetrafluoroethyl 2,2,2-trifluoroethyl ether ($CHF_2CF_2OCH_2CF_3$), and 1,1,1,3,3,3-hexafluoro-2-methoxypropane (($CF_3)_2CHOCH_3$).

The hydrofluoroether may be at least one member selected from the group consisting of a compound represented by the following formula (B-1), a compound represented by the following formula (B-2), a compound represented by the following formula (B-3), a compound represented by the following formula (B-4), $(CF_3)_2CHOCH_3$, $(CF_3)_2CFOCH_3$, $CF_3CHFCF_2OCH_3$, and $CF_3CHFCF_2OCF_3$.

Formula (B-1):

$$F(CF_2)_pO(CH_2)_qH \qquad (B-1),$$

wherein p is an integer of 1 to 6, and q is an integer of 1 to 4.

Formula (B-2):

$$H(CF_2)_pO(CF_2)_qF \qquad (B-2),$$

wherein p and q are as defined above.

Formula (B-3):

$$H(CF_2)_pO(CH_2)_qH \qquad (B-3),$$

wherein p and q are as defined above.

Formula (B-4):

$$X(CF_2)_pCH_2O(CF_2)_qH \qquad (B-4),$$

wherein X represents fluorine or hydrogen, and p and q are as defined above.

The hydrofluoroether is more preferably a compound represented by the following formula (B-5):

$$R^{21}-O-R^{22} \qquad (B-5),$$

wherein $R^{21}$ is linear or branched propyl or butyl in which at least one hydrogen atom is replaced by fluorine, and $R^{22}$ is methyl or ethyl. The compound represented by formula (B-5) may be a compound in which $R^{21}$ is perfluorobutyl, and $R^{22}$ is methyl or ethyl.

The olefin compound containing at least one chlorine atom is a $C_2$-$C_4$ (preferably $C_2$-$C_3$) olefin compound containing at least one chlorine atom in its structure. The olefin compound containing at least one chlorine atom is a compound in which at least one of the hydrogen atoms bonded to the carbon atoms in a $C_2$-$C_4$ hydrocarbon having one or two (preferably one) double bonds is replaced by chlorine.

The number of chlorine atoms is one to the maximum substitutable number. The number of chlorine atoms may be, for example, one, two, three, four, or five.

The olefin compound containing at least one chlorine atom may contain at least one (e.g., one, two, three, four, or five) fluorine atom.

Examples of olefin compounds containing at least one chlorine atom include $CH_2=CHCl$, $CHCl=CHCl$, $CCl_2=CHCl$, $CCl_2=CCl_2$, $CF_3CH=CHCl$, $CHF_2CF=CHCl$, $CFH_2CF=CHCl$, $CF_3CCl=CFCl$, $CF_2HCl=CFCl$, and $CFH_2Cl=CFCl$.

Preferred examples of olefin compounds containing at least one chlorine atom include $CHCl=CHCl$, $CHF_2CF=CHCl$, $CF_3CH=CHCl$, and $CF_3CCl=CFCl$.

As the aprotic solvent (B), a hydrofluoroether is preferable because it has less environmental impact during use and can be easily distilled off from the polymer.

The aprotic solvent (B) may have a global warming potential (GWP) of, for example, 600 or less, or 400 or less. The aprotic solvent (B) preferably has a global warming potential (GWP) of 375 or less, more preferably 350 or less, and particularly preferably 0. The lower limit of the global warming potential (GWP) of the aprotic solvent (B) may be 1 or more, or 5 or more.

In the composition according to the present disclosure, the content of the aprotic solvent (B) may be 80 mass % or less based on the mass of the composition. The content of the aprotic solvent (B) may be preferably within the range of 35 mass % to 80 mass %, more preferably 35 mass % to less than 80 mass %, and particularly preferably 50 mass % to less than 80 mass %, based on the mass of the composition.

Other Components

The composition according to the present disclosure may comprise the starting monomer, an oligomer formed from the starting monomer, a polymerization initiator, impurities derived from the starting material, etc., in addition to the fluorine-containing polymer (A) and the aprotic solvent (B). The amounts of the components contained in the composition can be adjusted, for example, by setting the production conditions for the fluorine-containing polymer (A) (e.g., temperature, time, the kind and amount of starting monomer, the kind and amount of solvent, or the kind and amount of polymerization initiator). The amounts of the components can also be adjusted by purification after the production of the fluorine-containing polymer (A).

Composition (A3) Comprising Fluorine-Containing Polymer (A3) and Aprotic Solvent (B)

The "fluorine-containing polymer (A3)" is an embodiment of the fluorine-containing polymer (A) and means a fluorine-containing polymer (A) comprising the structural unit (A3) as the main component.

The "composition (A3)" is an embodiment of the composition according to the present disclosure described thus far and is a composition comprising (A) a fluorine-containing polymer containing the structural unit (A3) as the main component and (B) an aprotic solvent.

The composition (A3) comprising the fluorine-containing polymer (A3) and the aprotic solvent (B) is an embodiment of the composition according to the present disclosure. Thus, not only may the matters described thus far be applied to the composition (A3), but also the matters described in this section may be applied to the composition (A3) in place of or in addition to the matters described thus far.

In the composition (A3), the content of the fluorine-containing polymer (A3) may be, for example, 20 mass % or more, 30 mass % or more, greater than 30 mass %, or 31 mass % or more. The content of the fluorine-containing polymer (A3) is preferably within the range of 20 mass % to 65 mass %, greater than 20 mass % to 65 mass %, or 20 mass % to 50 mass %, more preferably within the range of 30 mass % to 65 mass %, greater than 30 mass % to 65 mass %, or 31 mass % to 65 mass %, and particularly preferably within the range of 30 mass % to 50 mass %, greater than 30 mass % to 50 mass %, or 31 mass % to 50 mass %.

In the composition (A3), the content of the aprotic solvent may be, for example, 80 mass % or less, 70 mass % or less, less than 70 mass %, or 69 mass % or less. The content of the aprotic solvent is preferably within the range of 35 mass % to 80 mass %, 35 mass % to less than 80 mass %, or 50 mass % to 80 mass %, more preferably within the range of 35 mass % to 70 mass %, 35 mass % to less than 70 mass %, or 35 mass % to 69 mass %, and particularly preferably within the range of 50 mass % to 70 mass %, 50 mass % to less than 70 mass %, or 50 mass % to 69 mass %.

Composition (A3-2) Comprising Fluorine-Containing Polymer (A3) and Nonperfluoro Solvent as Aprotic Solvent (B)

In another aspect of the composition according to the present disclosure, the composition according to the present disclosure is a composition (A3-2) comprising the fluorine-containing polymer (A3) and a nonperfluoro solvent as the aprotic solvent (B). In the composition (A3-2), the fluorine-containing polymer (A3) may be dissolved even though the solvent is a nonperfluoro solvent.

The matters described in the sections other than this section may be applied to the composition (A3-2); however, the concentration of the fluorine-containing polymer (A3) may be less than 20 mass %.

Method for Producing Fluorine-Containing Polymer (A)

The fluorine-containing polymer (A) is produced by subjecting a monomer to a polymerization reaction in the presence of a polymerization initiator.

The monomer comprises a monomer (M) corresponding to the structural unit contained as the main component in the fluorine-containing polymer (A).

The polymerization reaction is performed in an aprotic solvent (B).

The aprotic solvent (B) is at least one solvent selected from the group consisting of a perfluoroaromatic compound, a perfluorotrialkylamine, a perfluoroalkane, a perfluorocyclic ether, a hydrofluoroether, and an olefin compound containing at least one chlorine atom.

In the method for producing the fluorine-containing polymer (A) according to the present disclosure, an aprotic solvent (B) in which the content or dissolution amount of fluorine-containing polymer (A) is high can be obtained. Thus, the production method according to the present disclosure is suitable as a method for producing the composition according to the present disclosure.

Monomer

The "monomer (M)" is a monomer corresponding to the structural unit contained as the main component in the fluorine-containing polymer (A). In addition to the monomer (M), other monomers can be used as monomers. In the present specification, monomers corresponding to structural units that are contained in the fluorine-containing polymer (A) and are structural units other than the structural unit contained as the main component may be referred to as "other monomers."

Those skilled in the art can understand that a polymerization reaction of a specific monomer yields a fluorine-containing polymer (A) containing a structural unit corresponding to the monomer. Thus, those skilled in the art can select a suitable monomer to produce the desired fluorine-containing polymer (A).

For example, the monomers corresponding to the structural unit (A1-1), structural unit (A2-1), structural unit (A2-2), structural unit (A3-1), and structural unit (A11-1) may be respectively monomers represented by the following formula (M1-1), formula (M2-1), formula (M2-2), formula (M3-1), and formula (M11-1) (which may be respectively referred to as "monomer (M1-1)," "monomer (M2-1)," "monomer (M2-2)," "monomer (M3-1)," and "monomer (M11-1)" in the present specification).

(M1-1)

(M2-1)

(M2-2)

(M3-1)

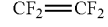

(M11-1)

As the monomer (M), one kind of monomer (M) may be used singly, or two or more kinds of monomers (M) may be used in combination. Moreover, the monomer (M) can also be used in combination with other monomers. For example, the monomer (A2-1) and the monomer (A11-1) can be used in combination to produce a fluorine-containing polymer (A) containing the structural unit (A2-1) and the structural unit (A11-1).

Aprotic Solvent (B)

In the production method according to the present disclosure, the monomer is polymerized in an aprotic solvent (B). For details of the aprotic solvent (B), reference is made to the description of the aprotic solvent (B) in the composition according to the present disclosure, unless otherwise specified.

Polymerization Initiator

In the production method according to the present disclosure, the monomer is polymerized in the presence of a polymerization initiator. The polymerization initiator may be any polymerization initiator that can polymerize the monomer (M), and is, for example, a radical polymerization initiator. The polymerization initiator preferably has a 10-hour half-life temperature within the range of 0° C. to 160° C.

The polymerization initiator preferably contains one or more fluorine atoms since a liquid composition having a high fluorine-containing polymer (A) content can be obtained. The polymerization initiator is more preferably a nonperfluoro polymerization initiator. The nonperfluoro polymerization initiator is a polymerization initiator containing hydrogen and fluorine atoms. Thus, the nonperfluoro polymerization initiator does not include perfluoro compounds.

The polymerization initiators may be used singly or in a combination of two or more.

Examples of polymerization initiators include compounds represented by the following formulas (C1), (C2), and (C3) (which may be respectively referred to as "compound (C1)," "compound (C2)," and "compound (C3)" in the present specification) and inorganic peroxides. The compounds (C1) to (C3) and inorganic peroxides may be used singly or in combination:

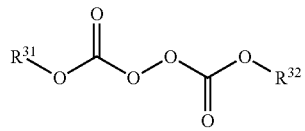
(C1)

wherein $R^{31}$ and $R^{32}$ are the same or different, and each is a group in which at least one fluorine atom of $C_3$-$C_{10}$ perfluoroalkyl optionally substituted with perfluorophenyl is replaced by hydrogen, or a group in which at least one fluorine atom of perfluorophenyl optionally substituted with linear or branched $C_1$-$C_4$ perfluoroalkyl is replaced by hydrogen;

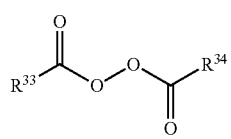
(C2)

wherein $R^{33}$ and $R^{34}$ are the same or different, and each is a group in which at least one fluorine atom of $C_3$-$C_{10}$ perfluoroalkyl optionally substituted with perfluorophenyl is replaced by hydrogen, or a group in which at least one fluorine atom of perfluorophenyl optionally substituted with linear or branched $C_1$-$C_4$ perfluoroalkyl is replaced by hydrogen; and formula (C3):

(C3)

wherein $R^{35}$ and $R^{36}$ are the same or different, and each is a group in which at least one fluorine atom of $C_1$-$C_{10}$ perfluoroalkyl optionally substituted with perfluorophenyl is replaced by hydrogen, or a group in which at least one fluorine atom of perfluorophenyl optionally substituted with linear or branched $C_1$-$C_4$ perfluoroalkyl is replaced by hydrogen.

Preferably, $R^{31}$ and $R^{32}$ are the same or different, and each is perfluoropropyl, perfluoroisopropyl, perfluoro-2-phenyl-2-propyl, perfluorobutyl, perfluoro-sec-butyl, perfluoro-tert-butyl, perfluoropentyl, perfluoroisopentyl, perfluoroneopentyl, perfluoro-2-methyl-2-pentyl, perfluoro-2,4,4-trimethyl-2-pentyl, perfluorohexyl, perfluoro-2-methylhexyl, perfluoro-2-ethylhexyl, perfluorocyclohexyl, perfluoro-4-methylcyclohexyl, perfluoro-4-ethylcyclohexyl, perfluoro-4-tert-butylcyclohexyl, perfluoroheptyl, perfluoro-2-heptyl, perfluoro-3-heptyl, perfluorooctyl, perfluoro-2-methyl-2-octyl, perfluorononyl, perfluorodecyl, perfluorophenyl, perfluoro-2-methylphenyl, perfluoro-3-methylphenyl, or perfluoro-4-methylphenyl, in which at least one fluorine atom is replaced by hydrogen.

In $R^{31}$ and $R^{32}$, the number of fluorine atoms replaced by hydrogen is one to the maximum substitutable number, preferably three less than the maximum substitutable number to the maximum substitutable number, more preferably two less than the maximum substitutable number to the maximum substitutable number, even more preferably one less than the maximum substitutable number to the maximum substitutable number, and particularly preferably the maximum substitutable number.

More preferably, $R^{31}$ and $R^{32}$ are the same or different, and each is propyl, isopropyl, sec-butyl, 2-ethylhexyl, or 4-tert-butylcyclohexyl.

Particularly preferably, $R^{31}$ and $R^{32}$ are the same or different, and each is propyl or isopropyl.

Preferred examples of the compound (C1) include di-n-propyl peroxydicarbonate, diisopropyl peroxydicarbonate, di-sec-butyl peroxydicarbonate, bis(4-tert-butylcyclohexyl) peroxydicarbonate, and di-2-ethylhexyl peroxydicarbonate.

Particularly preferred examples of the compound (C1) include di-n-propyl peroxydicarbonate and diisopropyl peroxydicarbonate.

Preferably, $R^{33}$ and $R^{34}$ are the same or different, and each is perfluoropropyl, perfluoroisopropyl, perfluoro-2-phenyl-2-propyl, perfluorobutyl, perfluoro-sec-butyl, perfluoro-tert-butyl, perfluoropentyl, perfluoroisopentyl, perfluoroneopentyl, perfluoro-2-methyl-2-pentyl, perfluoro-2,4,4-trimethyl-2-pentyl, perfluorohexyl, perfluoro-2-methylhexyl, perfluoro-2-ethylhexyl, perfluorocyclohexyl, perfluoro-4-methylcyclohexyl, perfluoro-4-ethylcyclohexyl, perfluoro-4-tert-butylcyclohexyl, perfluoroheptyl, perfluoro-2-heptyl, perfluoro-3-heptyl, perfluorooctyl, perfluoro-2-methyl-2-octyl, perfluorononyl, perfluorodecyl, perfluorophenyl, perfluoro-2-methylphenyl, perfluoro-3-methylphenyl, or perfluoro-4-methylphenyl, in which at least one fluorine atom is replaced by hydrogen.

In $R^{33}$ and $R^{34}$, the number of fluorine atoms replaced by hydrogen is one to the maximum substitutable number, preferably three less than the maximum substitutable number to the maximum substitutable number, more preferably two less than the maximum substitutable number to the maximum substitutable number, and even more preferably one less than the maximum substitutable number to the maximum substitutable number.

More preferably, $R^{33}$ and $R^{34}$ are the same or different, and each is isopropyl, 2,4,4-trimethylpentyl, ω-hydro-dodecafluorohexyl, ω-hydro-hexadecafluorooctyl, phenyl, or 3-methylphenyl.

Preferred examples of the compound (C2) include diisobutyryl peroxide, di(3,5,5-trimethylhexanoyl)peroxide, di(ω-hydro-dodecafluoroheptanoyl)peroxide, di(ω-hydro-hexadecafluorononanoyl)peroxide, ω-hydro-dodecafluoroheptanoyl-ω-hydro-hexadecafluorononanoyl-peroxide, benzoyl peroxide, benzoyl m-methylbenzoyl peroxide, and m-toluoyl peroxide.

Particularly preferred examples of the compound (C2) include diisobutyryl peroxide, di(ω-hydro-dodecafluoroheptanoyl)peroxide, di(ω-hydro-hexadecafluorononanoyl)peroxide, ω-hydro-dodecafluoroheptanoyl-ω-hydro-hexadecafluorononanoyl-peroxide, and benzoyl peroxide.

Preferably, $R^{35}$ and $R^{36}$ are the same or different, and each is perfluoromethyl, perfluoroethyl, perfluoropropyl, perfluoroisopropyl, perfluoro-2-phenyl-2-propyl, perfluorobutyl, perfluoro-sec-butyl, perfluoro-tert-butyl, perfluoropentyl, perfluoroisopentyl, perfluoroneopentyl, perfluoro-2-methyl-2-pentyl, perfluoro-2,4,4-trimethyl-2-pentyl, perfluorohexyl, perfluoro-2-methylhexyl, perfluoro-2-ethylhexyl, perfluorocyclohexyl, perfluoro-4-methylcyclohexyl, perfluoro-4-ethylcyclohexyl, perfluoro-4-tert-butylcyclohexyl, perfluoroheptyl, perfluoro-2-heptyl, perfluoro-3-heptyl, perfluorooctyl, perfluoro-2-methyl-2-octyl, perfluorononyl, perfluorodecyl, perfluorophenyl, perfluoro-2-methylphenyl, perfluoro-3-methylphenyl, or perfluoro-4-methylphenyl, in which at least one fluorine atom is replaced by hydrogen.

In $R^{35}$ and $R^{36}$, the number of fluorine atoms replaced by hydrogen is one to the maximum substitutable number, preferably three less than the maximum substitutable number to the maximum substitutable number, more preferably two less than the maximum substitutable number to the maximum substitutable number, even more preferably one less than the maximum substitutable number to the maximum substitutable number, and particularly preferably the maximum substitutable number.

More preferably, $R^{35}$ and $R^{36}$ are the same or different, and each is isopropyl, 2-phenyl-2-propyl, tert-butyl, 2-methyl-2-pentyl, 2,4,4-trimethyl-2-pentyl, 2-heptyl, 2-methyl-2-octyl, phenyl, or 3-methylphenyl.

Preferred examples of the compound (C3) include tert-butyl peroxyneodecanoate, tert-butyl peroxypivalate, tert-hexyl peroxypivalate, OO-tert-butyl O-isopropyl peroxycarbonate, and tert-butyl peroxyacetate.

Particularly preferred examples of the compound (C3) include tert-butyl peroxypivalate and tert-hexyl peroxypivalate.

Preferred examples of inorganic peroxides include ammonium salts, sodium salts, and potassium salts of persulfuric acid, perboric acid, perchloric acid, perphosphoric acid, percarbonic acid, and permanganic acid.

Particularly preferred examples of inorganic peroxides include ammonium persulfate, sodium persulfate, and potassium persulfate.

The inorganic peroxides may be used singly or in a combination of two or more. The inorganic peroxides may be used in combination with reducing agents, such as sulfite-based reducing agents (e.g., sodium dithionite) and sulfite reducing agents (e.g., sodium sulfite, ammonium sulfite, and sodium hydrogen sulfite).

Preferred examples of polymerization initiators include di-n-propyl peroxydicarbonate, diisopropyl peroxydicarbonate, diisobutyryl peroxide, di(ω-hydro-dodecafluoroheptanoyl)peroxide, di(ω-hydro-hexadecafluorononanoyl)peroxide, ω-hydro-dodecafluoroheptanoyl-ω-hydro-hexadecafluorononanoyl-peroxide, benzoyl peroxide, tert-butyl peroxypivalate, tert-hexyl peroxypivalate, ammonium persulfate, sodium persulfate, and potassium persulfate.

Particularly preferred examples of polymerization initiators include di-n-propyl peroxydicarbonate, diisopropyl peroxydicarbonate, diisobutyryl peroxide, di(ω-hydro-dodecafluoroheptanoyl)peroxide, benzoyl peroxide, tert-butyl peroxypivalate, tert-hexyl peroxypivalate, and ammonium persulfate.

The amount of monomer (M) used in the polymerization reaction can be appropriately determined according to, for example, the proportion of the structural unit corresponding to the monomer (M) in the desired fluorine-containing polymer (A). For example, the amount of monomer (M) is 50 mol % or more, preferably 80 mol % or more, even more preferably 90 mcl % or more, and particularly preferably 100 mol %, based on the total number of moles of all of the starting monomers.

When one or more other monomers are used in addition to the monomer (M), the amount of the other monomers can be appropriately determined according to, for example, the proportion of the structural units corresponding to the other monomers in the desired fluorine-containing polymer (A). For example, the amount of the other monomers is 50 mol % or less, preferably 20 mol % or less, more preferably 10 mol % or less, and particularly preferably 0 mol %, based on the total number of moles of all of the starting monomers.

The amount of aprotic solvent (B) used in the polymerization reaction may be within the range of 20 mass % to 300 mass %, preferably 35 mass % to 250 mass %, and more preferably 50 mass % to 300 mass %, based on the amount of monomer (M) taken as 100 mass %. The amount of polymerization initiator used in the polymerization reaction may be, for example, within the range of 0.0001 g to 0.05 g, preferably 0.0001 g to 0.01 g, and more preferably 0.0005 g to 0.008 g, per gram of all monomers (i.e., the total amount of monomer (M) and other monomers) to be subjected to the reaction.

The temperature of the polymerization reaction may be, for example, within the range of −10° C. to 160° C., preferably 0° C. to 160° C., and more preferably 0° C. to 100° C.

The polymerization reaction may be performed at a temperature that is not greater than 20° C. higher than the boiling point of the monomer (M) corresponding to the structural unit used as the main component of the fluorine-containing polymer (A) or the boiling point of the aprotic solvent, whichever is lower, and that is not greater than 20° C. higher than the 10-hour half-life temperature of the polymerization initiator. In this case, the lower limit of the temperature may be, for example, −10° C., and preferably 0° C.

The reaction time of the polymerization reaction may be preferably within the range of 0.5 hours to 72 hours, more preferably 1 hour to 48 hours, and even more preferably 3 hours to 30 hours.

The polymerization reaction can be performed in the presence or absence of an inert gas (e.g., nitrogen gas), and preferably in the presence of an inert gas.

The polymerization reaction can be performed under reduced pressure, atmospheric pressure, or increased pressure.

The polymerization reaction can be performed by adding the monomer to the aprotic solvent (B) containing the polymerization initiator. The polymerization reaction can also be performed by adding the polymerization initiator to the aprotic solvent (B) containing the monomer.

The fluorine-containing polymer (A) produced in the polymerization reaction can be isolated or purified, if desired, by a conventional method, such as extraction, dissolution, concentration, filtration, precipitation, dehydration, adsorption, or chromatography, or a combination of these methods.

The fluorine-containing polymer (A) generally has low solubility in the aprotic solvent (B). It has been thus difficult to form a coating film or the like that contains a high concentration of the fluorine-containing polymer (A). However, the production method according to the present disclosure makes it possible to produce a liquid in which the fluorine-containing polymer (A) is dissolved at a high concentration in the aprotic solvent (B). For example, the production method according to the present disclosure makes it possible to produce a liquid in which the amount of fluorine-containing polymer (A) dissolved is 20 mass % or more, preferably within the range of 20 mass % to 65 mass %, more preferably greater than 20 mass % to 65 mass %, and particularly preferably greater than 20 mass % to 50 mass %, based on the total mass of the fluorine-containing polymer (A) and the aprotic solvent (B).

The fluorine-containing polymer (A) may be purified and isolated from the liquid. In another embodiment, the liquid may be used as is for applications in which the fluorine-containing polymer (A) is required.

When the fluorine-containing polymer (A) is the fluorine-containing polymer (A3), the amount of fluorine-containing polymer (A3) dissolved may be, for example, 20 mass % or more, 30 mass % or more, greater than 30 mass %, or 31 mass % or more, preferably within the range of 20 mass % to 65 mass %, greater than 20 mass % to 65 mass %, or 20 mass % to 50 mass %, more preferably within the range of 30 mass % to 65 mass %, greater than 30 mass % to 65 mass %, or 31 mass % to 65 mass %, and particularly preferably within the range of 30 mass % to 50 mass %, greater than 30 mass % to 50 mass %, or 31 mass % to 50 mass %, based on the total mass of the fluorine-containing polymer (A3) and the aprotic solvent (B).

When the fluorine-containing polymer (A) is the fluorine-containing polymer (A3), and the aprotic solvent is a nonperfluoro solvent, the amount of fluorine-containing polymer (A3) dissolved may be less than 20 mass % in addition to the above ranges, such as 1 mass % or more, 5 mass % or more, 10 mass % or more, 15 mass % or more, 20 mass % or more, 30 mass % or more, greater than 30 mass %, or 31 mass % or more, preferably within the range of 20 mass % to 65 mass %, greater than 20 mass % to 65 mass %, or 20 mass % to 50 mass %, more preferably within the range of 30 mass % to 65 mass %, greater than 30 mass % to 65 mass %, or 31 mass % to 65 mass %, and particularly preferably within the range of 30 mass % to 50 mass %, greater than 30 mass % to 50 mass %, or 31 mass % to 50 mass %.

The fluorine-containing polymer (A) produced by the production method according to the present disclosure can be used in conventionally known applications of the fluorine-containing polymer (A). Examples of the applications include a pellicle film formed on a photomask used in the lithography process; and the like.

Although embodiments are described above, it can be understood that various modifications in form and details may be made without departing from the spirit and scope of the claims.

The present disclosure includes, for example, the following embodiments.

Item 1.

A composition comprising:

(A) a fluorine-containing polymer comprising as a main component a structural unit containing a fluorine-containing aliphatic ring; and (B) an aprotic solvent, wherein the fluorine-containing aliphatic ring of the fluorine-containing polymer (A) contains one, two, or three etheric oxygen atoms as a ring-constituting atom;

when the fluorine-containing aliphatic ring contains a plurality of etheric oxygen atoms, the etheric oxygen atoms are not adjacent to each other; and the fluorine-containing polymer (A) is present in an amount of 20 mass % or more based on the mass of the composition.

Item 2.

The composition according to Item 1, wherein the fluorine-containing polymer (A) is present in an amount of 20 mass % to 65 mass % based on the mass of the composition.

Item 3.

The composition according to Item 1 or 2, wherein the fluorine-containing polymer (A) is present in an amount of greater than 20 mass % to 65 mass % based on the mass of the composition.

Item 4.

The composition according to any one of Items 1 to 3, wherein the aprotic solvent (B) is at least one solvent selected from the group consisting of a perfluoroaromatic compound, a perfluorotrialkylamine, a perfluoroalkane, a hydrofluorocarbon, a perfluorocyclic ether, a hydrofluoroether, and an olefin compound containing at least one chlorine atom.

Item 5.

The composition according to any one of Items 1 to 4, wherein the aprotic solvent (B) is a hydrofluoroether.

Item 6.

The composition according to any one of Items 1 to 5, wherein the aprotic solvent (B) has a global warming potential (GWP) of 400 or less.

Item 7.

The composition according to any one of Items 1 to 6, wherein the aprotic solvent (B) is at least one hydrofluoroether selected from the group consisting of a compound represented by formula (B-1):

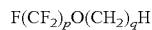

$$F(CF_2)_pO(CH_2)_qH \qquad (B-1),$$

wherein p is an integer of 1 to 6, and q is an integer of 1 to 4; a compound represented by formula (B-2):

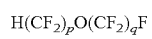

$$H(CF_2)_pO(CF_2)_qF \qquad (B-2),$$

wherein p and q are as defined above;

a compound represented by formula (B-3):

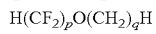   (B-3), wherein p and q are as defined above;
a compound represented by formula (B-4):

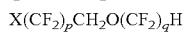   (B-4), wherein X represents fluorine or hydrogen, and p and q are as defined above;
$(CF_3)_2CHOCH_3$;
$(CF_3)_2CFOCH_3$;
$CF_3CHFCF_2OCH_3$; and
$CF_3CHFCF_2OCF_3$.

Item 8.

The composition according to any one of Items 1 to 7, wherein the aprotic solvent (B) is a compound represented by formula (B-5):

$R^{21}$—O—$R^{22}$   (B-5), wherein $R^{21}$ is linear or branched propyl or butyl in which at least one hydrogen atom is replaced by fluorine, and $R^{22}$ is methyl or ethyl.

Item 9.

The composition according to any one of Items 1 to 8, wherein the fluorine-containing aliphatic ring of the fluorine-containing polymer (A) is a 4-, 5-, 6-, or 7-membered ring.

Item 10.

The composition according to any one of Items 1 to 9, wherein the fluorine-containing polymer (A) comprises a structural unit represented by the following formula (A1):

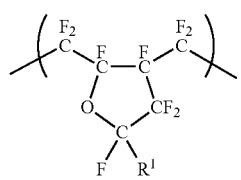   (A1)

wherein $R^1$ represents fluorine or $C_1$-$C_5$ perfluoroalkyl; a structural unit represented by the following formula (A2):

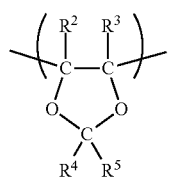   (A2)

wherein $R^2$ to $R^5$ each independently represent fluorine, $C_1$-$C_5$ perfluoroalkyl, or $C_1$-$C_5$ perfluoroalkoxy; or
a structural unit represented by the following formula (A3):

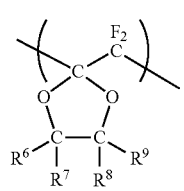   (A3)

wherein $R^6$ to $R^9$ each independently represent fluorine, $C_1$-$C_5$ perfluoroalkyl, or $C_1$-$C_5$ perfluoroalkoxy, as the main component.

Item 11.

The composition according to any one of Items 1 to 10, wherein the fluorine-containing polymer (A) comprises the structural unit represented by formula (A3) as the main component.

Item 12.

The composition according to any one of Items 1 and 4 to 8, wherein the fluorine-containing polymer (A) is a fluorine-containing polymer (A) other than a polymer comprising the structural unit represented by formula (A3) as the main component, and the fluorine-containing polymer (A) is present in an amount of 30 mass % or more based on the mass of the composition.

Item 13.

The composition according to Item 12, wherein the fluorine-containing polymer (A) is present in an amount of greater than 30 mass % based on the mass of the composition.

Item 14.

The composition according to any one of Items 1 to 10, wherein the fluorine-containing polymer (A) comprises a structural unit represented by the following formula (A1-1):

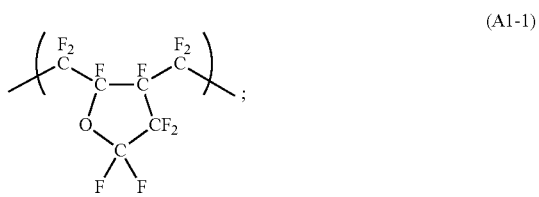   (A1-1)

a structural unit represented by the following formula (A2-1):

   (A2-1)

a structural unit represented by the following formula (A2-2):

   (A2-2)

or a structural unit represented by the following formula (A3-1):

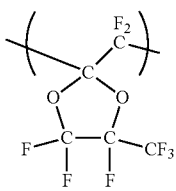

as the main component.

Item 15.

The composition according to Item 11, wherein the fluorine-containing polymer (A) comprises the structural unit represented by formula (A3-1) as the main component.

Item 16.

The composition according to Item 12 or 13, wherein the fluorine-containing polymer (A) comprises the structural unit represented by formula (A1-1), the structural unit represented by formula (A2-1), or the structural unit represented by formula (A2-2) as the main component.

Item 17.

The composition according to any one of Items 1 to 16, wherein the fluorine-containing polymer (A) has a mass average molecular weight of 5000 to 1000000.

Item 18.

The composition according to any one of Items 1 to 17, wherein the fluorine-containing polymer (A) has a mass average molecular weight of 40000 to 500000.

Item 19.

A method for producing a fluorine-containing polymer comprising as a main component a structural unit containing a fluorine-containing aliphatic ring (A) by subjecting a monomer to a polymerization reaction in the presence of a polymerization initiator,
wherein the fluorine-containing aliphatic ring of the fluorine-containing polymer (A) contains one, two, or three etheric oxygen atoms as a ring-constituting atom;
when the fluorine-containing aliphatic ring contains a plurality of etheric oxygen atoms, the etheric oxygen atoms are not adjacent to each other;
the monomer comprises a monomer (M) corresponding to the structural unit contained as the main component in the fluorine-containing polymer (A);
the polymerization reaction is performed in an aprotic solvent (B); and
the aprotic solvent (B) is at least one solvent selected from the group consisting of a perfluoroaromatic compound, a perfluorotrialkylamine, a perfluoroalkane, a perfluorocyclic ether, a hydrofluoroether, and an olefin compound containing at least one chlorine atom.

Item 20.

The production method according to Item 19, wherein the polymerization initiator has a 10-hour half-life temperature of 0° C. to 160° C.; and the polymerization reaction is performed in the aprotic solvent (B) at a temperature that is not greater than 20° C. higher than a boiling point of the monomer (M) or a boiling point of the aprotic solvent, whichever is lower, and that is not greater than 20° C. higher than the 10-hour half-life temperature of the polymerization initiator.

Item 21.

The production method according to Item 19 or 20, wherein the polymerization initiator is a nonperfluoro polymerization initiator.

Item 22.

The production method according to any one of Items 19 to 21, wherein the polymerization initiator is at least one member selected from the group consisting of
a compound represented by formula (C1):

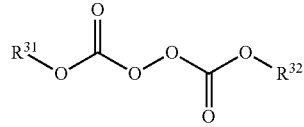

wherein $R^{31}$ and $R^{32}$ are the same or different, and each is a group in which at least one fluorine atom of $C_3$-$C_{10}$ perfluoroalkyl optionally substituted with perfluorophenyl is replaced by hydrogen, or a group in which at least one fluorine atom of perfluorophenyl optionally substituted with linear or branched $C_1$-$C_4$ perfluoroalkyl is replaced by hydrogen;
a compound represented by formula (C2):

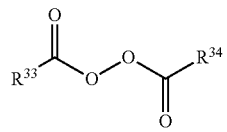

wherein $R^{33}$ and $R^{34}$ are the same or different, and each is a group in which at least one fluorine atom of $C_3$-$C_{10}$ perfluoroalkyl optionally substituted with perfluorophenyl is replaced by hydrogen, or a group in which at least one fluorine atom of perfluorophenyl optionally substituted with linear or branched $C_1$-$C_4$ perfluoroalkyl is replaced by hydrogen;
a compound represented by formula (C3):

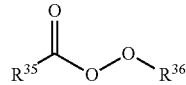

wherein $R^{35}$ and $R^{36}$ are the same or different, and each is a group in which at least one fluorine atom of $C_1$-$C_{10}$ perfluoroalkyl optionally substituted with perfluorophenyl is replaced by hydrogen, or a group in which at least one fluorine atom of perfluorophenyl optionally substituted with linear or branched $C_1$-$C_4$ perfluoroalkyl is replaced by hydrogen; and an inorganic peroxide.

Item 23.

The production method according to any one of Items 19 to 22, wherein the aprotic solvent (B) is a hydrofluoroether.

Item 24.

The production method according to any one of Items 19 to 23, wherein the aprotic solvent (B) has a global warming potential (GWP) of 400 or less.

Item 25.

The production method according to any one of Items 19 to 24, wherein the aprotic solvent (B) is at least one hydrofluoroether selected from the group consisting of a compound represented by formula (B-1):

$$F(CF_2)_pO(CH_2)_qH \quad (B-1),$$

wherein p is an integer of 1 to 6, and q is an integer of 1 to 4;
a compound represented by formula (B-2):

$$H(CF_2)_pO(CF_2)_qF \quad (B-2),$$

wherein p and q are as defined above;
a compound represented by formula (B-3):

$$H(CF_2)_pO(CH_2)_qH \quad (B-3),$$

wherein p and q are as defined above;
a compound represented by formula (B-4):

$$X(CF_2)_pCH_2O(CF_2)_qH \quad (B-4),$$

wherein X represents fluorine or hydrogen, and p and q are as defined above;
$(CF_3)_2CHOCH_3$;
$(CF_3)_2CFOCH_3$;
$CF_3CHFCF_2OCH_3$; and
$CF_3CHFCF_2OCF_3$.

Item 26.

The production method according to any one of Items 19 to 25, wherein the aprotic solvent (B) is a compound represented by formula (B-5):

$$R^{21}-O-R^{22} \quad (B-5),$$

wherein $R^{21}$ is linear or branched propyl or butyl in which at least one hydrogen atom is replaced by fluorine, and $R^{22}$ is methyl or ethyl.

Item 27.

The production method according to any one of Items 19 to 26, wherein the amount of the aprotic solvent (B) in the polymerization reaction is within the range of 20 mass % to 300 mass % based on the mass of the monomer (M).

Item 28.

The production method according to any one of Items 19 to 27, wherein the amount of the aprotic solvent (B) in the polymerization reaction is within the range of 50 mass % to 200 mass % based on the mass of the monomer (M).

Item 29.

The production method according to any one of Items 19 to 28, wherein the fluorine-containing aliphatic ring of the fluorine-containing polymer (A) is a 4-, 5-, 6-, or 7-membered ring.

Item 30.

The production method according to any one of Items 19 to 29, wherein the fluorine-containing polymer (A) comprises a structural unit represented by the following formula (A1):

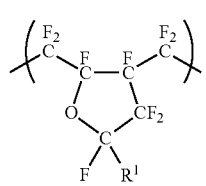

wherein $R^1$ represents fluorine or $C_1$-$C_5$ perfluoroalkyl; a structural unit represented by the following formula (A2):

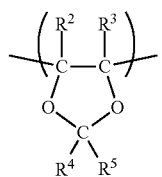

wherein $R^2$ to $R^5$ each independently represent fluorine, $C_1$-$C_5$ perfluoroalkyl, or $C_1$-$C_5$ perfluoroalkoxy; or
a structural unit represented by the following formula (A3):

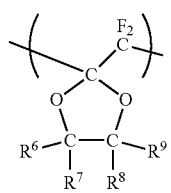

wherein $R^6$ to $R^9$ each independently represent fluorine, $C_1$-$C_5$ perfluoroalkyl, or $C_1$-$C_5$ perfluoroalkoxy,
as the main component.

Item 31.

The production method according to any one of Items 19 to 30, wherein the fluorine-containing polymer (A) comprises the structural unit represented by formula (A3) as the main component.

Item 32.

The production method according to any one of Items 19 to 30, wherein the fluorine-containing polymer (A) is a fluorine-containing polymer (A) other than a polymer comprising the structural unit represented by formula (A3) as the main component.

Item 33.

The production method according to any one of Items 19 to 30, wherein the fluorine-containing polymer (A) comprises a structural unit represented by the following formula (A1-1):

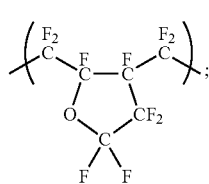

a structural unit represented by the following formula (A2-1):

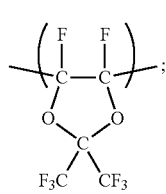

a structural unit represented by the following formula (A2-2):

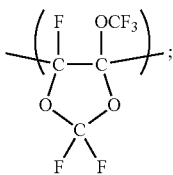
(A2-2)

or a structural unit represented by the following formula (A3-1):

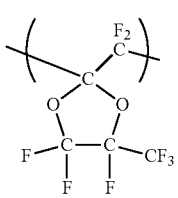
(A3-1)

as the main component.

Item 34.

The production method according to Item 31, wherein the fluorine-containing polymer (A) comprises the structural unit represented by formula (A3-1) as the main component.

Item 35.

The production method according to Item 32, wherein the fluorine-containing polymer (A) comprises the structural unit represented by formula (A1-1), the structural unit represented by formula (A2-1), or the structural unit represented by formula (A2-2) as the main component.

Item 36.

The production method according to any one of Items 19 to 35, wherein the fluorine-containing polymer (A) has a mass average molecular weight of 5000 to 1000000.

Item 37.

The production method according to any one of Items 19 to 36, wherein the fluorine-containing polymer (A) has a mass average molecular weight of 40000 to 500000.

Item 38.

A composition comprising:

(A) a fluorine-containing polymer comprising as a main component a structural unit containing a fluorine-containing aliphatic ring; and (B) an aprotic solvent, the fluorine-containing polymer (A) comprising as the main component a structural unit represented by the following formula (A3):

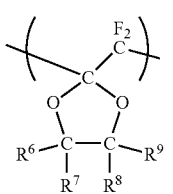
(A3)

wherein $R^6$ to $R^9$ each independently represent fluorine, $C_1$-$C_5$ perfluoroalkyl, or $C_1$-$C_5$ perfluoroalkoxy, and the aprotic solvent (B) being a nonperfluoro solvent.

Item 39.

The composition according to Item 38, wherein the nonperfluoro solvent is a hydrofluoroether.

Item 40.

The composition according to Item 38 or 39, wherein the nonperfluoro solvent has a global warming potential (GWP) of 400 or less.

Item 41.

The composition according to any one of Items 38 to 40, wherein the nonperfluoro solvent is at least one hydrofluoroether selected from the group consisting of a compound represented by formula (B-1):

$$F(CF_2)_pO(CH_2)_qH \quad \text{(B-1)},$$

wherein p is an integer of 1 to 6, and q is an integer of 1 to 4;

a compound represented by formula (B-2):

$$H(CF_2)_pO(CF_2)_qF \quad \text{(B-2)},$$

wherein p and q are as defined above;

a compound represented by formula (B-3):

$$H(CF_2)_pO(CH_2)_qH \quad \text{(B-3)},$$

wherein p and q are as defined above;

a compound represented by formula (B-4):

$$X(CF_2)_pCH_2O(CF_2)_qH \quad \text{(B-4)},$$

wherein X represents fluorine or hydrogen, and p and q are as defined above;

$(CF_3)_2CHOCH_3$;
$(CF_3)_2CFOCH_3$;
$CF_3CHFCF_2OCH_3$; and
$CF_3CHFCF_2OCF_3$.

Item 42.

The composition according to any one of Items 38 to 41, wherein the nonperfluoro solvent is a compound represented by formula (B-5):

$$R^{21}-O-R^{22} \quad \text{(B-5)},$$

wherein $R^{21}$ is linear or branched propyl or butyl in which at least one hydrogen atom is replaced by fluorine, and $R^{22}$ is methyl or ethyl.

EXAMPLES

An embodiment of the present disclosure is described in more detail below with reference to Examples; however, the present disclosure is not limited to these.

The symbols and abbreviations in the Examples are used with the following meanings.

PMMA: polymethyl methacrylate

Initiator solution (1): a methanol solution containing 50 mass % di-n-propyl peroxydicarbonate (10-hour half-life temperature: 40° C.)

Initiator solution (2): a perfluorohexane solution containing 7 mass % di(ω-hydro-dodecafluoroheptanoyl)peroxide (10-hour half-life temperature: 15° C.)

Fluorine-containing polymer (A3-1): a polymer comprising the structural unit (A3-1)

GPC Analysis Method

Sample Preparation Method

A polymer is dissolved in perfluorobenzene to prepare a 2 wt % polymer solution, and the polymer solution is passed through a membrane filter (0.22 μm) to obtain a sample solution.

Measurement Method
Standard sample for measurement of molecular weight: PMMA Detection method: RI (differential refractometer)
Criteria for Polymer Solubility Whether the polymer in each composition was dissolved was determined as follows.

Each of prepared compositions was visually checked. When no undissolved polymer was observed and the entire composition flowed uniformly at room temperature, it was determined that the polymer was dissolved.

Example 1: Production of Composition Comprising Structural Unit (A3-1) as Main Component The monomer (M3-1) (10 g), methyl nonafluorobutyl ether (15 g) as a solvent, and the initiator solution (1) (0.017 g) were placed in a 50-mL glass container, and then a polymerization reaction was performed for 20 hours while the mixture was heated such that the internal temperature was maintained at 40° C., thereby producing a composition containing 36 wt % fluorine-containing polymer (A3-1) (8.5 g; Mw: 273268). The solubility of the polymer was visually determined, and it was confirmed that the obtained solution was completely homogeneous.

The weight of the polymer in the composition was measured by distilling off the unreacted starting material, the solvent, the initiator residue, and the impurities contained in a trace amount in the monomer (the "impurities" means HF, 4,4,5-trifluoro-2,5-bis(trifluoromethyl)-1,3-dioxolane, 2-(difluoromethyl)-2,4,4,5-tetrafluoro-5-(trifluoromethyl)-1,3-dioxolane, 4,4,5-trifluoro-2,5-bis(trifluoromethyl)-1,3-dioxolane-2-carboxylic acid, and the like; the same applies to other Examples) by vacuum drying at 120° C. after the completion of the polymerization reaction.

Example 2: Production of Composition Comprising Structural Unit (A3-1) as Main Component The monomer (M3-1) (10 g), methyl nonafluorobutyl ether (20 g) as a solvent, and the initiator solution (1) (0.030 g) were placed in a 50-mL glass container, and then a polymerization reaction was performed for 20 hours while the mixture was heated such that the internal temperature was maintained at 40° C., thereby producing a composition containing 31 wt % fluorine-containing polymer (A3-1) (8.8 g; Mw: 143514). The solubility of the polymer was visually determined, and it was confirmed that the obtained solution was completely homogeneous.

The weight of the polymer in the composition was measured by distilling off the unreacted starting material, the solvent, the initiator residue, and the impurities contained in a trace amount in the monomer by vacuum drying at 120° C. after the completion of the polymerization reaction.

Example 3: Production of Composition Comprising Structural Unit (A3-1) as Main Component The monomer (M3-1) (10 g), methyl nonafluorobutyl ether (20 g) as a solvent, and the initiator solution (1) (0.041 g) were placed in a 50-mL glass container, and then a polymerization reaction was performed for 20 hours while the mixture was heated such that the internal temperature was maintained at 40° C., thereby producing a composition containing 31 wt % fluorine-containing polymer (A3-1) (9.1 g; Mw: 107403). The solubility of the polymer was visually determined, and it was confirmed that the obtained solution was completely homogeneous.

The weight of the polymer in the composition was measured by distilling off the unreacted starting material, the solvent, the initiator residue, and the impurities contained in a trace amount in the monomer by vacuum drying at 120° C. after the completion of the polymerization reaction.

Example 4: Production of Composition Comprising Structural Unit (A3-1) as Main Component The monomer (M3-1) (10 g), methyl nonafluorobutyl ether (30 g) as a solvent, and the initiator solution (1) (0.017 g) were placed in a 50-mL glass container, and then a polymerization reaction was performed for 20 hours while the mixture was heated such that the internal temperature was maintained at 40° C., thereby producing a composition containing 23 wt % fluorine-containing polymer (A3-1) (9.0 g; Mw: 147399). The solubility of the polymer was visually determined, and it was confirmed that the obtained solution was completely homogeneous.

The weight of the polymer in the composition was measured by distilling off the unreacted starting material, the solvent, the initiator residue, and the impurities contained in a trace amount in the monomer by vacuum drying at 120° C. after the completion of the polymerization reaction.

Example 5: Production of Composition Comprising Structural Unit (A3-1) as Main Component The monomer (M3-1) (10 g), methyl nonafluorobutyl ether (60 g) as a solvent, and the initiator solution (1) (0.013 g) were placed in a 50-mL glass container, and then a polymerization reaction was performed for 20 hours while the mixture was heated such that the internal temperature was maintained at 40° C., thereby producing a composition containing 11 wt % fluorine-containing polymer (A3-1) (7.4 g; Mw: 99273). The solubility of the polymer was visually determined, and it was confirmed that the obtained solution was completely homogeneous.

The weight of the polymer in the composition was measured by distilling off the unreacted starting material, the solvent, the initiator residue, and the impurities contained in a trace amount in the monomer by vacuum drying at 120° C. after the completion of the polymerization reaction.

Example 6: Production of Composition Comprising Structural Unit (A3-1) as Main Component The monomer (M3-1) (10 g), methyl nonafluorobutyl ether (80 g) as a solvent, and the initiator solution (1) (0.013 g) were placed in a 50-mL glass container, and then a polymerization reaction was performed for 20 hours while the mixture was heated such that the internal temperature was maintained at 40° C., thereby producing a composition containing 7 wt % fluorine-containing polymer (A3-1) (6.1 g; Mw: 82991). The solubility of the polymer was visually determined, and it was confirmed that the obtained solution was completely homogeneous.

The weight of the polymer in the composition was measured by distilling off the unreacted starting material, the solvent, the initiator residue, and the impurities contained in a trace amount in the monomer by vacuum drying at 120° C. after the completion of the polymerization reaction.

Example 7: Production of Composition Comprising Structural Unit (A3-1) as Main Component The monomer (M3-1) (10 g), ethyl nonafluorobutyl ether (boiling point: 76° C.) (5 g) as a solvent, and the initiator solution (1) (0.020 g) were placed in a 50-mL glass container, and then a polymerization reaction was performed for 20 hours while the mixture was heated such that the internal temperature was maintained at 40° C., thereby producing a composition containing 64 wt % fluorine-containing polymer (A3-1) (8.7 g; Mw: 114791). The solubility of the polymer was visually determined, and it was confirmed that the obtained solution was completely homogeneous.

The weight of the polymer in the composition was measured by distilling off the unreacted starting material, the solvent, the initiator residue, and the impurities contained in a trace amount in the monomer by vacuum drying at 120° C. after the completion of the polymerization reaction.

Example 8: Production of Composition Comprising Structural Unit (A3-1) as Main Component The monomer (M3-1) (10 g), ethyl nonafluorobutyl ether (12 g) as a solvent, and the initiator solution (1) (0.015 g) were placed in a 50-mL glass container, and then a polymerization reaction was performed for 20 hours while the mixture was heated such that the internal temperature was maintained at 40° C., thereby producing a composition containing 44 wt % fluorine-containing polymer (A3-1) (9.3 g; Mw: 150609). The solubility of the polymer was visually determined, and it was confirmed that the obtained solution was completely homogeneous.

The weight of the polymer in the composition was measured by distilling off the unreacted starting material, the solvent, the initiator residue, and the impurities contained in a trace amount in the monomer by vacuum drying at 120° C. after the completion of the polymerization reaction.

Example 9: Production of Composition Comprising Structural Unit (A3-1) as Main Component The monomer (M3-1) (10 g), ethyl nonafluorobutyl ether (12 g) as a solvent, and the initiator solution (1) (0.035 g) were placed in a 50-mL glass container, and then a polymerization reaction was performed for 20 hours while the mixture was heated such that the internal temperature was maintained at 40° C., thereby producing a composition containing 45 wt % fluorine-containing polymer (A3-1) (9.7 g; Mw: 127901). The solubility of the polymer was visually determined, and it was confirmed that the obtained solution was completely homogeneous.

The weight of the polymer in the composition was measured by distilling off the unreacted starting material, the solvent, the initiator residue, and the impurities contained in a trace amount in the monomer by vacuum drying at 120° C. after the completion of the polymerization reaction.

Example 10: Production of Composition Comprising Structural Unit (A3-1) as Main Component The monomer (M3-1) (10 g), ethyl nonafluorobutyl ether (12 g) as a solvent, and the initiator solution (1) (0.054 g) were placed in a 50-mL glass container, and then a polymerization reaction was performed for 20 hours while the mixture was heated such that the internal temperature was maintained at 40° C., thereby producing a composition containing 45 wt % fluorine-containing polymer (A3-1) (9.7 g; Mw: 113366). The solubility of the polymer was visually determined, and it was confirmed that the obtained solution was completely homogeneous.

The weight of the polymer in the composition was measured by distilling off the unreacted starting material, the solvent, the initiator residue, and the impurities contained in a trace amount in the monomer by vacuum drying at 120° C. after the completion of the polymerization reaction.

Example 11: Production of Composition Comprising Structural Unit (A3-1) as Main Component The monomer (M3-1) (10 g), ethyl nonafluorobutyl ether (20 g) as a solvent, and the initiator solution (1) (0.041 g) were placed in a 50-mL glass container, and then a polymerization reaction was performed for 20 hours while the mixture was heated such that the internal temperature was maintained at 40° C., thereby producing a composition containing 31 wt % fluorine-containing polymer (A3-1) (9.0 g; Mw: 97533). The solubility of the polymer was visually determined, and it was confirmed that the obtained solution was completely homogeneous.

The weight of the polymer in the composition was measured by distilling off the unreacted starting material, the solvent, the initiator residue, and the impurities contained in a trace amount in the monomer by vacuum drying at 120° C. after the completion of the polymerization reaction.

Example 12: Production of Composition Comprising Structural Unit (A3-1) as Main Component The monomer (M3-1) (10 g), ethyl nonafluorobutyl ether (30 g) as a solvent, and the initiator solution (1) (0.041 g) were placed in a 50-mL glass container, and then a polymerization reaction was performed for 20 hours while the mixture was heated such that the internal temperature was maintained at 40° C., thereby producing a composition containing 22 wt % fluorine-containing polymer (A3-1) (8.6 g; Mw: 63291). The solubility of the polymer was visually determined, and it was confirmed that the obtained solution was completely homogeneous.

The weight of the polymer in the composition was measured by distilling off the unreacted starting material, the solvent, the initiator residue, and the impurities contained in a trace amount in the monomer by vacuum drying at 120° C. after the completion of the polymerization reaction.

Example 13: Production of Composition Comprising Structural Unit (A3-1) as Main Component The monomer (M3-1) (10 g), ethyl nonafluorobutyl ether (60 g) as a solvent, and the initiator solution (1) (0.020 g) were placed in a 50-mL glass container, and then a polymerization reaction was performed for 20 hours while the mixture was heated such that the internal temperature was maintained at 40° C., thereby producing a composition containing 10 wt % fluorine-containing polymer (A3-1) (7.0 g; Mw: 73154). The solubility of the polymer was visually determined, and it was confirmed that the obtained solution was completely homogeneous.

The weight of the polymer in the composition was measured by distilling off the unreacted starting material, the solvent, the initiator residue, and the impurities contained in a trace amount in the monomer by vacuum drying at 120° C. after the completion of the polymerization reaction.

Example 14: Production of Composition Comprising Structural Unit (A3-1) as Main Component The monomer (M3-1) (10 g), ethyl nonafluorobutyl ether (80 g) as a solvent, and the initiator solution (1) (0.020 g) were placed in a 50-mL glass container, and then a polymerization reaction was performed for 20 hours while the mixture was heated such that the internal temperature was maintained at 40° C., thereby producing a composition containing 6 wt % fluorine-containing polymer (A3-1) (5.5 g; Mw: 52838). The solubility of the polymer was visually determined, and it was confirmed that the obtained solution was completely homogeneous.

The weight of the polymer in the composition was measured by distilling off the unreacted starting material, the solvent, the initiator residue, and the impurities contained in a trace amount in the monomer by vacuum drying at 120° C. after the completion of the polymerization reaction.

Example 15: Production of Composition Comprising Structural Unit (A3-1) as Main Component The monomer (M3-1) (10 g), 3-methoxytridecafluorohexane (boiling point: 98° C.) (20 g) as a solvent, and the initiator solution (1) (0.034 g) were placed in a 50-mL glass container, and then a polymerization reaction was performed for 20 hours while the mixture was heated such that the internal temperature was maintained at 40° C., thereby producing a composition containing 31 wt % fluorine-containing polymer (A3-1) (8.9 g; Mw: 131202). The solubility of the polymer was visually determined, and it was confirmed that the obtained solution was completely homogeneous.

The weight of the polymer in the composition was measured by distilling off the unreacted starting material, the solvent, the initiator residue, and the impurities contained in a trace amount in the monomer by vacuum drying at 120° C. after the completion of the polymerization reaction.

Example 16: Production of Composition Comprising Structural Unit (A3-1) as Main Component The monomer (M3-1) (10 g), perfluorotripropylamine (boiling point: 128° C.) (15 g) as a solvent, and the initiator solution (1) (0.052 g) were placed in a 50-mL glass container, and then a polymerization reaction was performed for 20 hours while the mixture was heated such that the internal temperature was maintained at 40° C., thereby producing a composition containing 37 wt % fluorine-containing polymer (A3-1) (8.9 g; Mw: 158427). The solubility of the polymer was visually determined, and it was confirmed that the obtained solution was completely homogeneous.

The weight of the polymer in the composition was measured by distilling off the unreacted starting material, the solvent, the initiator residue, and the impurities contained in a trace amount in the monomer by vacuum drying at 120° C. after the completion of the polymerization reaction.

Example 17: Production of Composition Comprising Structural Unit (A3-1) as Main Component The monomer (M3-1) (10 g), perfluorotripropylamine (10 g) as a solvent, and the initiator solution (1) (0.052 g) were placed in a 20-mL glass container, and then a polymerization reaction was performed for 20 hours while the mixture was heated such that the internal temperature was maintained at 40° C., thereby producing a composition containing 49 wt % fluorine-containing polymer (A3-1) (9.5 g; Mw: 213475). The solubility of the polymer was visually determined, and it was confirmed that the obtained solution was completely homogeneous.

The weight of the polymer in the composition was measured by distilling off the unreacted starting material, the solvent, the initiator residue, and the impurities contained in a trace amount in the monomer by vacuum drying at 120° C. after the completion of the polymerization reaction.

Example 18: Production of Composition Comprising Structural Unit (A3-1) as Main Component The monomer (M3-1) (10 g), perfluoro-5-butyltetrahydrofuran (boiling point: 102° C.) (15 g) as a solvent, and the initiator solution (1) (0.025 g) were placed in a 20-mL glass container, and then a polymerization reaction was performed for 20 hours while the mixture was heated such that the internal temperature was maintained at 40° C., thereby producing a composition containing 38 wt % fluorine-containing polymer (A3-1) (9.0 g; Mw: 158992). The solubility of the polymer was visually determined, and it was confirmed that the obtained solution was completely homogeneous.

The weight of the polymer in the composition was measured by distilling off the unreacted starting material, the solvent, the initiator residue, and the impurities contained in a trace amount in the monomer by vacuum drying at 120° C. after the completion of the polymerization reaction.

Example 19: Production of Composition Comprising Structural Unit (A3-1) as Main Component The monomer (M3-1) (10 g), perfluorohexane (boiling point: 56° C.) (10 g) as a solvent, and the initiator solution (1) (0.025 g) were placed in a 20-mL glass container, and then a polymerization reaction was performed for 20 hours while the mixture was heated such that the internal temperature was maintained at 40° C., thereby producing a composition containing 45 wt % fluorine-containing polymer (A3-1) (8.2 g; Mw: 128122). The solubility of the polymer was visually determined, and it was confirmed that the obtained solution was completely homogeneous.

The weight of the polymer in the composition was measured by distilling off the unreacted starting material, the solvent, the initiator residue, and the impurities contained in a trace amount in the monomer by vacuum drying at 120° C. after the completion of the polymerization reaction.

Example 20: Production of Composition Comprising Structural Unit (A3-1) as Main Component The monomer (M3-1) (10 g), perfluorobenzene (boiling point: 80° C.) (10 g) as a solvent, and the initiator solution (1) (0.031 g) were placed in a 20-mL glass container, and then a polymerization reaction was performed for 20 hours while the mixture was heated such that the internal temperature was maintained at 40° C., thereby producing a composition containing 32 wt % fluorine-containing polymer (A3-1) (4.7 g; Mw: 45323). The solubility of the polymer was visually determined, and it was confirmed that the obtained solution was completely homogeneous.

The weight of the polymer in the composition was measured by distilling off the unreacted starting material, the solvent, the initiator residue, and the impurities contained in a trace amount in the monomer by vacuum drying at 120° C. after the completion of the polymerization reaction.

Example 21: Production of Composition Comprising Structural Unit (A3-1) as Main Component The monomer (M3-1) (10 g), methyl nonafluorobutyl ether (20 g) as a solvent, and the initiator solution (2) (0.010 g) were placed in a 20-mL glass container, and then a polymerization reaction was performed for 20 hours while the internal temperature was adjusted to 15° C., thereby producing a composition containing 32 wt % fluorine-containing polymer (A3-1) (9.3 g; Mw: 217533). The solubility of the polymer was visually determined, and it was confirmed that the obtained solution was completely homogeneous.

The weight of the polymer in the composition was measured by distilling off the unreacted starting material, the solvent, the initiator residue, and the impurities contained in a trace amount in the monomer by vacuum drying at 120° C. after the completion of the polymerization reaction.

Example 22: Production of Composition Comprising Structural Unit (A3-1) as Main Component The monomer (M3-1) (10 g), methyl nonafluorobutyl ether (20 g) as a solvent, and the initiator solution (2) (0.022 g) were placed in a 20-mL glass container, and then a polymerization reaction was performed for 20 hours while the internal temperature was adjusted to 15° C., thereby producing a composition containing 32 wt % fluorine-containing polymer (A3-1) (9.6 g; Mw: 109215). The solubility of the polymer was visually determined, and it was confirmed that the obtained solution was completely homogeneous.

The weight of the polymer in the composition was measured by distilling off the unreacted starting material, the solvent, the initiator residue, and the impurities contained in a trace amount in the monomer by vacuum drying at 120° C. after the completion of the polymerization reaction.

Example 23: Production of Composition Comprising Structural Unit (A3-1) as Main Component The monomer (M3-1) (10 g), perfluorotripropylamine (15 g) as a solvent, and the initiator solution (2) (0.017 g) were placed in a 20-mL glass container, and then a polymerization reaction was performed for 20 hours while the internal temperature was adjusted to 15° C., thereby producing a composition containing 36 wt % fluorine-containing polymer (A3-1) (8.6 g; Mw: 163900). The solubility of the polymer was visually determined, and it was confirmed that the obtained solution was completely homogeneous.

The weight of the polymer in the composition was measured by distilling off the unreacted starting material, the solvent, the initiator residue, and the impurities contained in a trace amount in the monomer by vacuum drying at 120° C. after the completion of the polymerization reaction.

Example 24: Production of Composition Comprising Structural Unit (A3-1) as Main Component The monomer (M3-1) (10 g), 1,1,1,2,3,3-hexafluoropropyl methyl ether (15 g) as a solvent, and the initiator solution (1) (0.041 g) were placed in a 50-mL glass container, and then a polymerization reaction was performed for 20 hours while the internal temperature was adjusted to 40° C., thereby producing a composition containing 37 wt % fluorine-containing polymer (A3-1) (9.3 g; Mw: 99264). The solubility of the polymer was visually determined, and it was confirmed that the obtained solution was completely homogeneous.

The weight of the polymer in the composition was measured by distilling off the unreacted starting material, the solvent, the initiator residue, and the impurities contained in a trace amount in the monomer by vacuum drying at 120° C. after the completion of the polymerization reaction.

Example 25: Production of Composition Comprising Structural Unit (A3-1) as Main Component The monomer (M3-1) (10 g), 1,1,1,2,3,3-hexafluoropropyl methyl ether (20 g) as a solvent, and the initiator solution (1) (0.037 g) were placed in a 50-mL glass container, and then a polymerization reaction was performed for 20 hours while the internal temperature was adjusted to 40° C., thereby producing a composition containing 30 wt % fluorine-containing polymer (A3-1) (8.9 g; Mw: 80192). The solubility of the polymer was visually determined, and it was confirmed that the obtained solution was completely homogeneous.

The weight of the polymer in the composition was measured by distilling off the unreacted starting material, the solvent, the initiator residue, and the impurities contained in a trace amount in the monomer by vacuum drying at 120° C. after the completion of the polymerization reaction.

Example 26: Production of Composition Comprising Structural Unit (A3-1) as Main Component The monomer (M3-1) (10 g), 1,1,1,2,3,3-hexafluoropropyl methyl ether (20 g) as a solvent, and the initiator solution (2) (0.025 g) were placed in a 50-mL glass container, and then a polymerization reaction was performed for 20 hours while the internal temperature was adjusted to 15° C., thereby producing a composition containing 31 wt % fluorine-containing polymer (A3-1) (9.4 g; Mw: 102931). The solubility of the polymer was visually determined, and it was confirmed that the obtained solution was completely homogeneous.

The weight of the polymer in the composition was measured by distilling off the unreacted starting material, the solvent, the initiator residue, and the impurities contained in a trace amount in the monomer by vacuum drying at 120° C. after the completion of the polymerization reaction.

Example 27: Production of Composition Comprising Structural Unit (A3-1) as Main Component The monomer (M3-1) (10 g), 1,1,2,2-tetrafluoroethyl 2,2,2-trifluoroethyl ether (15 g) as a solvent, and the initiator solution (1) (0.040 g) were placed in a 50-mL glass container, and then a polymerization reaction was performed for 20 hours while the internal temperature was adjusted to 40° C., thereby producing a composition containing 36 wt % fluorine-containing polymer (A3-1) (8.9 g; Mw: 110481). The solubility of the polymer was visually determined, and it was confirmed that the obtained solution was completely homogeneous.

The weight of the polymer in the composition was measured by distilling off the unreacted starting material, the solvent, the initiator residue, and the impurities contained in a trace amount in the monomer by vacuum drying at 120° C. after the completion of the polymerization reaction.

Example 28: Production of Composition Comprising Structural Unit (A3-1) as Main Component The monomer (M3-1) (10 g), 1,1,2,2-tetrafluoroethyl 2,2,2-trifluoroethyl ether (20 g) as a solvent, and the initiator solution (1) (0.034 g) were placed in a 50-mL glass container, and then a polymerization reaction was performed for 20 hours while the internal temperature was adjusted to 40° C., thereby producing a composition containing 29 wt % fluorine-containing polymer (A3-1) (8.6 g; Mw: 97423). The solubility of the polymer was visually determined, and it was confirmed that the obtained solution was completely homogeneous.

The weight of the polymer in the composition was measured by distilling off the unreacted starting material, the solvent, the initiator residue, and the impurities contained in a trace amount in the monomer by vacuum drying at 120° C. after the completion of the polymerization reaction.

Example 29: Production of Composition Comprising Structural Unit (A3-1) as Main Component The monomer (M3-1) (10 g), 1,1,2,2-tetrafluoroethyl 2,2,2-trifluoroethyl ether (20 g) as a solvent, and the initiator solution (2) (0.023 g) were placed in a 50-mL glass container, and then a polymerization reaction was performed for 20 hours while the internal temperature was adjusted to 15° C., thereby producing a composition containing 31 wt % fluorine-containing polymer (A3-1) (9.2 g; Mw: 126345). The solubility of the polymer was visually determined, and it was confirmed that the obtained solution was completely homogeneous.

The weight of the polymer in the composition was measured by distilling off the unreacted starting material, the solvent, the initiator residue, and the impurities contained in a trace amount in the monomer by vacuum drying at 120° C. after the completion of the polymerization reaction.

Example 30: Production of Composition Comprising Structural Unit (A3-1) as Main Component The monomer (M3-1) (10 g), 1,1,1,3,3,3-hexafluoro-2-methoxypropane (15 g) as a solvent, and the initiator solution (1) (0.040 g) were placed in a 50-mL glass container, and then a polymerization reaction was performed for 20 hours while the internal temperature was adjusted to 40° C., thereby producing a composition containing 34 wt % fluorine-containing polymer (A3-1) (8.4 g; Mw: 78016). The solubility of the polymer was visually determined, and it was confirmed that the obtained solution was completely homogeneous.

The weight of the polymer in the composition was measured by distilling off the unreacted starting material, the solvent, the initiator residue, and the impurities contained in a trace amount in the monomer by vacuum drying at 120° C. after the completion of the polymerization reaction.

Example 31: Production of Composition Comprising Structural Unit (A3-1) as Main Component The monomer (M3-1) (10 g), 1,1,1,3,3,3-hexafluoro-2-methoxypropane (20 g) as a solvent, and the initiator solution (1) (0.036 g) were placed in a 50-mL glass container, and then a polymerization reaction was performed for 20 hours while the internal temperature was adjusted to 40° C., thereby producing a composition containing 26 wt % fluorine-containing polymer (A3-1) (7.9 g; Mw: 70127). The solubility of the polymer was visually determined, and it was confirmed that the obtained solution was completely homogeneous.

The weight of the polymer in the composition was measured by distilling off the unreacted starting material, the solvent, the initiator residue, and the impurities contained in a trace amount in the monomer by vacuum drying at 120° C. after the completion of the polymerization reaction.

Example 32: Production of Composition Comprising Structural Unit (A3-1) as Main Component The monomer (M3-1) (10 g), 1,1,1,3,3,3-hexafluoro-2-methoxypropane (20 g) as a solvent, and the initiator solution (2) (0.022 g) were placed in a 50-mL glass container, and then a polymerization reaction was performed for 20 hours while the internal temperature was adjusted to 15° C., thereby producing a composition containing 30 wt % fluorine-containing polymer (A3-1) (8.9 g; Mw: 84829). The solubility of the polymer was visually determined, and it was confirmed that the obtained solution was completely homogeneous.

The weight of the polymer in the composition was measured by distilling off the unreacted starting material, the solvent, the initiator residue, and the impurities contained in a trace amount in the monomer by vacuum drying at 120° C. after the completion of the polymerization reaction.

Tables 1 and 2 show the results obtained in the Examples.

TABLE 1

| Entry | Monomer Kind | g | Initiator solution Kind | g | Solvent Structure | GWP | g | Polymer Structural unit | Polymerization method | g | Mw | Method for preparing composition | Solubility (visual evaluation) | Polymer concentration in composition wt % |
|---|---|---|---|---|---|---|---|---|---|---|---|---|---|---|
| Ex. 1 | M3-1 | 10 | (1) | 0.017 | $C_4F_9OCH_3$ | 297 | 15 | A3-1 | Solution polymerization | 8.5 | 273268 | Polymerization | ○ | 36% |
| Ex. 2 | M3-1 | 10 | (1) | 0.030 | $C_4F_9OCH_3$ | 297 | 20 | A3-1 | Solution polymerization | 8.8 | 143514 | Polymerization | ○ | 31% |
| Ex. 3 | M3-1 | 10 | (1) | 0.041 | $C_4F_9OCH_3$ | 297 | 20 | A3-1 | Solution polymerization | 9.1 | 107403 | Polymerization | ○ | 31% |
| Ex. 4 | M3-1 | 10 | (1) | 0.017 | $C_4F_9OCH_3$ | 297 | 30 | A3-1 | Solution polymerization | 9.0 | 147399 | Polymerization | ○ | 23% |
| Ex. 5 | M3-1 | 10 | (1) | 0.013 | $C_4F_9OCH_3$ | 297 | 60 | A3-1 | Solution polymerization | 7.4 | 99273 | Polymerization | ○ | 11% |
| Ex. 6 | M3-1 | 10 | (1) | 0.013 | $C_4F_9OCH_3$ | 297 | 80 | A3-1 | Solution polymerization | 6.1 | 82991 | Polymerization | ○ | 7% |
| Ex. 7 | M3-1 | 10 | (1) | 0.020 | $C_4F_9OC_2H_5$ | 57 | 5 | A3-1 | Solution polymerization | 8.7 | 114791 | Polymerization | ○ | 64% |
| Ex. 8 | M3-1 | 10 | (1) | 0.015 | $C_4F_9OC_2H_5$ | 57 | 12 | A3-1 | Solution polymerization | 9.3 | 150609 | Polymerization | ○ | 44% |
| Ex. 9 | M3-1 | 10 | (1) | 0.035 | $C_4F_9OC_2H_5$ | 57 | 12 | A3-1 | Solution polymerization | 9.7 | 127901 | Polymerization | ○ | 45% |
| Ex. 10 | M3-1 | 10 | (1) | 0.054 | $C_4F_9OC_2H_5$ | 57 | 12 | A3-1 | Solution polymerization | 9.7 | 113366 | Polymerization | ○ | 45% |
| Ex. 11 | M3-1 | 10 | (1) | 0.041 | $C_4F_9OC_2H_5$ | 57 | 20 | A3-1 | Solution polymerization | 9.0 | 97533 | Polymerization | ○ | 31% |
| Ex. 12 | M3-1 | 10 | (1) | 0.041 | $C_4F_9OC_2H_5$ | 57 | 30 | A3-1 | Solution polymerization | 8.6 | 63291 | Polymerization | ○ | 22% |
| Ex. 13 | M3-1 | 10 | (1) | 0.020 | $C_4F_9OC_2H_5$ | 57 | 60 | A3-1 | Solution polymerization | 7.0 | 73154 | Polymerization | ○ | 10% |
| Ex. 14 | M3-1 | 10 | (1) | 0.020 | $C_4F_9OC_2H_5$ | 57 | 80 | A3-1 | Solution polymerization | 5.5 | 52838 | Polymerization | ○ | 6% |
| Ex. 15 | M3-1 | 10 | (1) | 0.034 | $C_2F_5CF(OCH_3)C_3F_7$ | 310 | 20 | A3-1 | Solution polymerization | 8.9 | 131202 | Polymerization | ○ | 31% |

TABLE 2

| Entry | Monomer Kind | g | Initiator solution Kind | g | Solvent Structure | GWP | g | Polymer Structural unit | Polymerization method | g | Mw | Method for preparing composition | Solubility (visual evaluation) | Polymer concentration in composition wt % |
|---|---|---|---|---|---|---|---|---|---|---|---|---|---|---|
| Ex. 16 | M3-1 | 10 | (1) | 0.052 | $(CF_3CF_2CF_2)_3N$ | 8900 | 15 | A3-1 | Solution polymerization | 8.9 | 158427 | Polymerization | ○ | 37% |
| Ex. 17 | M3-1 | 10 | (1) | 0052 | $(CF_3CF_2CF_2)_3N$ | 8900 | 10 | A3-1 | Solution polymerization | 9.5 | 213475 | Polymerization | ○ | 49% |
| Ex. 18 | M3-1 | 10 | (1) | 0.025 | Perfluoro-5-butyltetra-hydrofuran | >10000 | 15 | A3-1 | Solution polymerization | 9.0 | 158992 | Polymerization | ○ | 38% |
| Ex. 19 | M3-1 | 10 | (1) | 0.025 | Perfluorohexane | 7400 | 10 | A3-1 | Solution polymerization | 8.2 | 128122 | Polymerization | ○ | 45% |
| Ex. 20 | M3-1 | 10 | (1) | 0.031 | Perfluorobenzene | 15 | 10 | A3-1 | Solution polymerization | 4.7 | 45323 | Polymerization | ○ | 32% |
| Ex. 21 | M3-1 | 10 | (2) | 0.010 | $C_4F_9OCH_3$ | 297 | 20 | A3-1 | Solution polymerization | 9.3 | 217533 | Polymerization | ○ | 32% |
| Ex. 22 | M3-1 | 10 | (2) | 0.022 | $C_4F_9OCH_3$ | 297 | 20 | A3-1 | Solution polymerization | 9.6 | 109215 | Polymerization | ○ | 32% |
| Ex. 23 | M3-1 | 10 | (2) | 0.017 | $(CF_3CF_2CF_2)_3N$ | 8900 | 15 | A3-1 | Solution polymerization | 8.6 | 163900 | Polymerization | ○ | 36% |
| Ex. 24 | M3-1 | 10 | (1) | 0.041 | $CF_3CHFCF_2OCH_3$ | 101 | 15 | A3-1 | Solution polymerization | 9.3 | 99264 | Polymerization | ○ | 37% |
| Ex. 25 | M3-1 | 10 | (1) | 0.037 | $CF_3CHFCF_2OCH_3$ | 101 | 20 | A3-1 | Solution polymerization | 8.9 | 80192 | Polymerization | ○ | 30% |
| Ex. 26 | M3-1 | 10 | (2) | 0.025 | $CF_3CHFCF_2OCH_3$ | 101 | 20 | A3-1 | Solution polymerization | 9.4 | 102931 | Polymerization | ○ | 31% |

TABLE 2-continued

| Entry | Monomer Kind | g | Initiator solution Kind | g | Solvent Structure | GWP | g | Polymer Structural unit | Polymerization method | g | Mw | Method for preparing composition | Solubility (visual evaluation) | Polymer concentration in composition wt % |
|---|---|---|---|---|---|---|---|---|---|---|---|---|---|---|
| Ex. 27 | M3-1 | 10 | (1) | 0.040 | CF$_3$CHFCF$_2$OCH$_3$ | 580 | 15 | A3-1 | Solution polymerization | 8.9 | 110481 | Polymerization | o | 36% |
| Ex. 28 | M3-1 | 10 | (1) | 0.034 | CF$_3$CHFCF$_2$OCH$_3$ | 580 | 20 | A3-1 | Solution polymerization | 8.6 | 97423 | Polymerization | o | 29% |
| Ex. 29 | M3-1 | 10 | (2) | 0.023 | CF$_3$CHFCF$_2$OCH$_3$ | 580 | 20 | A3-1 | Solution polymerization | 9.2 | 126345 | Polymerization | o | 31% |
| Ex. 30 | M3-1 | 10 | (1) | 0.040 | (CF$_3$)$_2$CHOCH$_3$ | 27 | 15 | A3-1 | Solution polymerization | 8.4 | 78016 | Polymerization | o | 34% |
| Ex. 31 | M3-1 | 10 | (1) | 0.036 | (CF$_3$)$_2$CHOCH$_3$ | 27 | 20 | A3-1 | Solution polymerization | 7.9 | 70127 | Polymerization | o | 26% |
| Ex. 32 | M3-1 | 10 | (2) | 0.022 | (CF$_3$)$_2$CHOCH$_3$ | 27 | 20 | A3-1 | Solution polymerization | 8.9 | 84829 | Polymerization | o | 30% |

The invention claimed is:

1. A composition comprising:
(A) a fluorine-containing polymer comprising as a main component a structural unit represented by the following formula (A3):

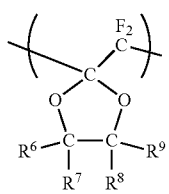

(A3)

wherein $R^6$ to $R^9$ each independently represent fluorine, $C_1$-$C_5$ perfluoroalkyl, or $C_1$-$C_5$ perfluoroalkoxy; and
(B) an aprotic solvent,
wherein the fluorine-containing polymer (A) is dissolved in the aprotic solvent (B) and the fluorine-containing polymer (A) dissolved in the aprotic solvent (B) is present in an amount of 20 mass % or more based on the mass of the composition.

2. The composition according to claim 1, wherein the fluorine-containing polymer (A) dissolved in the aprotic solvent (B) is present in an amount of 20 mass % to 65 mass % based on the mass of the composition.

3. The composition according to claim 1, wherein the fluorine-containing polymer (A) dissolved in the aprotic solvent (B) is present in an amount of greater than 20 mass % to 65 mass % based on the mass of the composition.

4. The composition according to claim 1, wherein the aprotic solvent (B) is at least one solvent selected from the group consisting of a perfluoroaromatic compound, a perfluorotrialkylamine, a perfluoroalkane, a hydrofluorocarbon, a perfluorocyclic ether, a hydrofluoroether, and an olefin compound containing at least one chlorine atom.

5. The composition according to claim 1, wherein the aprotic solvent (B) is a hydrofluoroether.

6. The composition according to claim 1, wherein the aprotic solvent (B) has a global warming potential (GWP) of 400 or less.

7. The composition according to claim 1, wherein the aprotic solvent (B) is at least one hydrofluoroether selected from the group consisting of a compound represented by formula (B-1):
F(CF$_2$)$_p$O(CH$_2$)$_q$H (B-1),
wherein p is an integer of 1 to 6, and q is an integer of 1 to 4;
a compound represented by formula (B-2):
H(CF$_2$)$_p$O(CF$_2$)$_q$F (B-2),
wherein p and q are as defined above;
a compound represented by formula (B-3):
H(CF$_2$)$_p$O(CH$_2$)$_q$H (B-3),
wherein p and q are as defined above;
a compound represented by formula (B-4):
X(CF$_2$)pCH$_2$O(CF$_2$)$_q$H (B-4),
wherein X represents fluorine or hydrogen, and p and q are as defined above;
(CF$_3$)$_2$CHOCH$_3$;
(CF$_3$)$_2$CFOCH$_3$;
CF$_3$CHFCF$_2$OCH$_3$; and
CF$_3$CHFCF$_2$OCF$_3$.

8. The composition according to claim 1, wherein the aprotic solvent (B) is a compound represented by formula (B-5):
$R^{21}$—O—$R^{22}$ (B-5),
wherein $R^{21}$ is linear or branched propyl or butyl in which at least one hydrogen atom is replaced by fluorine, and $R^{22}$ is methyl or ethyl.

9. The composition according to claim 1, wherein the structural unit represented by the formula (A3) is a structural unit represented by the following formula (A3-1):

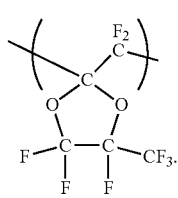

(A3-1)

10. The composition according to claim 1, wherein a proportion of the structural unit represented by the formula (A3) in the fluorine-containing polymer (A) is 80 mol % or more.

11. A method for producing a fluorine-containing polymer (A) comprising as a main component a structural unit represented by the following formula (A3):

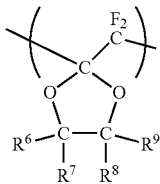
(A3)

wherein $R^6$ to $R^9$ each independently represent fluorine, $C_1$-$C_5$ perfluoroalkyl, or $C_1$-$C_5$ perfluoroalkoxy, wherein the monomer comprises a monomer (M) corresponding to the structural unit contained as the main component in the fluorine-containing polymer (A);

the polymerization reaction is performed in an aprotic solvent (B);

the aprotic solvent (B) is a hydrofluoroether;

the polymerization initiator is at least one member selected from the group consisting of a compound represented by formula (C1):

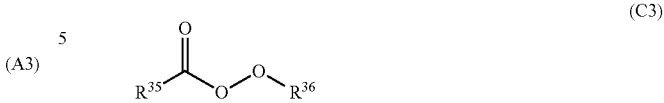
(C1)

wherein $R^{31}$ and $R^{32}$ are the same or different, and each is perfluoropropyl, perfluoroisopropyl, perfluoro-2-phenyl-2-propyl, perfluorobutyl, perfluoro-sec-butyl, perfluoro-tert-butyl, perfluoropentyl, perfluoroisopentyl, perfluoroneopentyl, perfluoro-2-methyl-2-pentyl, perfluoro-2,4,4-trimethyl-2-pentyl, perfluorohexyl, perfluoro-2-methylhexyl, perfluoro-2-ethylhexyl, perfluorocyclohexyl, perfluoro-4-methylcyclohexyl, perfluoro-4-ethylcyclohexyl, perfluoroheptyl, perfluoro-2-heptyl, perfluoro-3-heptyl, perfluorooctyl, perfluoro-2-methyl-2-octyl, perfluorononyl, perfluorodecyl, perfluorophenyl, perfluoro-2-methylphenyl, perfluoro-3-methylphenyl, or perfluoro-4-methylphenyl, in which at least one fluorine atom is replaced by hydrogen;

a compound represented by formula (C2):

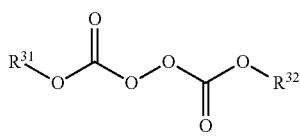
(C2)

wherein $R^{33}$ and $R^{34}$ are the same or different, and each is a group in which at least one fluorine atom of $C_3$-$C_{10}$ perfluoroalkyl optionally substituted with perfluorophenyl is replaced by hydrogen, or a group in which at least one fluorine atom of perfluorophenyl optionally substituted with linear or branched $C_1$-$C_4$ perfluoroalkyl is replaced by hydrogen;

a compound represented by formula (C3):

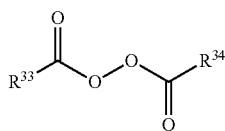
(C3)

wherein $R^{35}$ and $R^{36}$ are the same or different, and each is a group in which at least one fluorine atom of $C_1$-$C_{10}$ perfluoroalkyl optionally substituted with perfluorophenyl is replaced by hydrogen, or a group in which at least one fluorine atom of perfluorophenyl optionally substituted with linear or branched $C_1$-$C_4$ perfluoroalkyl is replaced by hydrogen; and an inorganic peroxide; and the polymer (A) is dissolved in the aprotic solvent (B), and the amount of the polymer (A) dissolved in the aprotic solvent (B) is 20 mass % or more based on the total mass of the polymer (A) and the aprotic solvent (B).

12. The production method according to claim 11, wherein the polymerization initiator has a 10-hour half-life temperature of 0° C. to 160° C.; and the polymerization reaction is performed in the aprotic solvent (B) at a temperature that is not greater than 20° C. higher than a boiling point of the monomer (M) or a boiling point of the aprotic solvent, whichever is lower, and that is not greater than 20° C. higher than the 10-hour half-life temperature of the polymerization initiator.

13. The production method according to claim 11, wherein the aprotic solvent (B) has a global warming potential (GWP) of 400 or less.

14. The production method according to claim 11, wherein the aprotic solvent (B) is at least one hydrofluoroether selected from the group consisting of a compound represented by formula (B-1):
$F(CF_2)_pO(CH_2)_qH$ (B-1),
wherein p is an integer of 1 to 6, and q is an integer of 1 to 4;

a compound represented by formula (B-2):
$H(CF_2)_pO(CF_2)_qF$ (B-2),
wherein p and q are as defined above;

a compound represented by formula (B-3):
$H(CF_2)_pO(CH_2)_qH$ (B-3),
wherein p and q are as defined above;

a compound represented by formula (B-4):
$X(CF_2)_pCH_2O(CF_2)_qH$ (B-4),
wherein X represents fluorine or hydrogen, and p and q are as defined above;

$(CF_3)_2CHOCH_3$;
$(CF_3)_2CFOCH_3$;
$CF_3CHFCF_2OCH_3$; and
$CF_3CHFCF_2OCF_3$.

15. The production method according to claim 11, wherein the aprotic solvent (B) is a compound represented by formula (B-5):
$R^{21}$—O—$R^{22}$ (B-5),
wherein $R^{21}$ is linear or branched propyl or butyl in which at least one hydrogen atom is replaced by fluorine, and $R^{22}$ is methyl or ethyl.

16. The production method according to claim 11, wherein the amount of the aprotic solvent (B) in the polymerization reaction is within the range of 20 mass % to 300 mass % based on the mass of the monomer (M).

17. The production method according to claim 11, wherein the amount of the aprotic solvent (B) in the polymerization reaction is within the range of 50 mass % to 200 mass % based on the mass of the monomer (M).

18. The production method according to claim 11, wherein the fluorine-containing polymer (A) has a mass average molecular weight of 5000 to 1000000.

19. The production method according to claim 11, wherein the fluorine-containing polymer (A) has a mass average molecular weight of 40000 to 500000.

\* \* \* \* \*